US012180962B2

(12) United States Patent
Hong

(10) Patent No.: US 12,180,962 B2
(45) Date of Patent: Dec. 31, 2024

(54) VACUUM PUMP WITH AN OIL MANAGEMENT SYSTEM

(71) Applicant: Fieldpiece Instruments, Inc., Orange, CA (US)

(72) Inventor: Tinggui Hong, Orange, CA (US)

(73) Assignee: Fieldpiece Instruments, Inc., Orange, CA (US)

( * ) Notice: Subject to any disclaimer, the term of this patent is extended or adjusted under 35 U.S.C. 154(b) by 0 days.

(21) Appl. No.: 18/536,819

(22) Filed: Dec. 12, 2023

(65) Prior Publication Data

US 2024/0110566 A1 Apr. 4, 2024

Related U.S. Application Data

(63) Continuation of application No. 17/069,358, filed on Oct. 13, 2020, now Pat. No. 11,852,143, which is a continuation of application No. 16/048,064, filed on Jul. 27, 2018, now Pat. No. 10,837,446.

(60) Provisional application No. 62/538,228, filed on Jul. 28, 2017.

(51) Int. Cl.

| | |
|---|---|
| ***F04C 28/24*** | (2006.01) |
| ***F04C 29/02*** | (2006.01) |
| *F04C 18/344* | (2006.01) |
| *F25B 45/00* | (2006.01) |

(52) U.S. Cl.

CPC ............ *F04C 28/24* (2013.01); *F04C 29/026* (2013.01); *F04C 18/344* (2013.01); *F04C 2220/10* (2013.01); *F05B 2260/95* (2013.01); *F25B 45/00* (2013.01)

(58) Field of Classification Search

CPC ........ F04B 23/023; F04B 23/04; F04B 53/16; F04B 53/22; F04C 18/344; F04C 28/24; F04C 29/026; F04C 2220/10; F04C 2220/50; F04C 2240/809; F04C 13/007; F16K 11/02; F16N 7/14; F16N 31/00; F25B 45/00; F25B 2345/00–007

See application file for complete search history.

(56) References Cited

U.S. PATENT DOCUMENTS

| | | | | | |
|---|---|---|---|---|---|
| 4,364,236 | A * | 12/1982 | Lower | F25B 45/00 62/84 |
| 4,688,388 | A * | 8/1987 | Lower | B60H 1/00585 62/149 |
| 2010/0068077 | A1* | 3/2010 | Sundheim | F04B 53/20 415/121.2 |
| 2010/0183467 | A1* | 7/2010 | Sundheim | F04C 13/007 418/88 |

(Continued)

*Primary Examiner* — Kenneth J Hansen
*Assistant Examiner* — Joseph S. Herrmann
(74) *Attorney, Agent, or Firm* — Paul J. Backofen, Esq.

(57) ABSTRACT

A vacuum pump system includes an air-cooled, O-ring sealed vacuum pump and an oil management system with an LED illuminated clear tank for observation of the oil condition as well as a large oil inlet and outlet for rapid and safe oil changes while the pump is operating. The oil management system is also configured to prevent oil from the sump from being drawn into an evacuated AC/R system when the pump is stopped and the intake ports are not sealed from the high vacuum AC/R system. The oil management system includes a preferential vacuum relief system that allows air instead of the oil from the sump to be drawn back into the evacuated lines.

6 Claims, 22 Drawing Sheets

(56) References Cited

U.S. PATENT DOCUMENTS

| | | | | |
|---|---|---|---|---|
| 2012/0272667 | A1 * | 11/2012 | Ferraro | F16N 7/32<br>62/77 |
| 2017/0191719 | A1 * | 7/2017 | Plasek | B60H 1/00585 |

* cited by examiner 35
29
5
30
33
12
15
19
35
16
13
5A
17
34
5B
5C
8
10
13
35
13
14
11C
11S
11
4

VACUUM PUMP WITH AN OIL MANAGEMENT SYSTEM

This application is a continuation of U.S. application Ser. No. 17/069,358, filed Oct. 13, 2020, now U.S. Pat. No. 11,852,143, which is a continuation of U.S. application Ser. No. 16/048,064, filed Jul. 27, 2018, now U.S. Pat. No. 10,837,446, which claims priority to U.S. Provisional Application 62/538,228, filed Jul. 28, 2017.

FIELD OF THE INVENTIONS

The inventions described below relate to the field of vacuum pumps.

BACKGROUND OF THE INVENTIONS

When the refrigerant tubing/piping of an Air Conditioning/Refrigeration (AC/R) system is exposed to atmosphere, air with water vapor and other contaminants may enter the tubing/piping. The moisture is highly damaging to refrigerant systems as it makes the refrigerant acidic which results in a corrosive environment that destroys system components and seals and changes compressor oil to sludge. Cooling efficiency is degraded as pressures and temperatures vary greatly throughout the system. Compressor damage can occur and expansion valves can become clogged.

During installation of a new system or an open system repair, the refrigeration tubing/piping is exposed to ambient air, water vapor and/or other contaminants. After repair/installation and closure, the system needs to be cleared and checked for leaks to prevent loss of system efficiency over time. Before an AC/R system can be charged with refrigerant, the system must be arid, sanitary and sealed. The AC/R system should be evacuated to remove the water vapor and other contaminants and tested to ensure that a deep vacuum is held.

Vacuum pumps used to evacuate AC/R systems are generally two-stage rotary vane pumps that use mineral oil to lubricate and seal the pump chamber. After the AC/R system is evacuated it is isolated from the vacuum pump and a precision vacuum gauge monitors the vacuum level for changes over a 5-20 minute period. If the vacuum holds, the evacuation is complete and the system is charged with refrigerant. In conventional vacuum pumps, when the pump is stopped and the intake ports are not sealed from the high vacuum AC/R system, the oil in the oil tank can be drawn back by the vacuum in the AC/R system to contaminate the AC/R system (as well as the hoses and the connected instruments). Oil contamination in an AC/R system is significantly bigger problem than a loss of vacuum and contamination by ambient air.

SUMMARY

The devices and methods described below provide for a vacuum pump system with an oil management system that is configured to prevent oil from the sump from being drawn into an evacuated AC/R system when the pump is stopped and the intake ports are not sealed from the high vacuum AC/R system. The oil management system includes a preferential vacuum relief system that allows air instead of the oil from the sump to be drawn back into the evacuated lines.

The vacuum pump system includes an air-cooled, O-ring sealed vacuum pump and an oil management system with a primary oil reservoir with an illuminated sump for observation of the oil condition. The oil reservoir also includes a large oil inlet and outlet for rapid and safe oil changes even while the pump is operating.

The oil flow path of the oil management system begins in the primary oil reservoir/sump and oil is pumped by the oil pump from the primary reservoir to an oil change reservoir. The contents of the oil change reservoir overflow into the primary oil reservoir and the sump. The oil in the oil change reservoir slowly feeds into the vacuum pump and it contains sufficient oil to support vacuum pump operations for a few minutes while the sump of the primary oil reservoir is drained and refilled.

DETAILED DESCRIPTION OF THE INVENTIONS

Figure 1A:
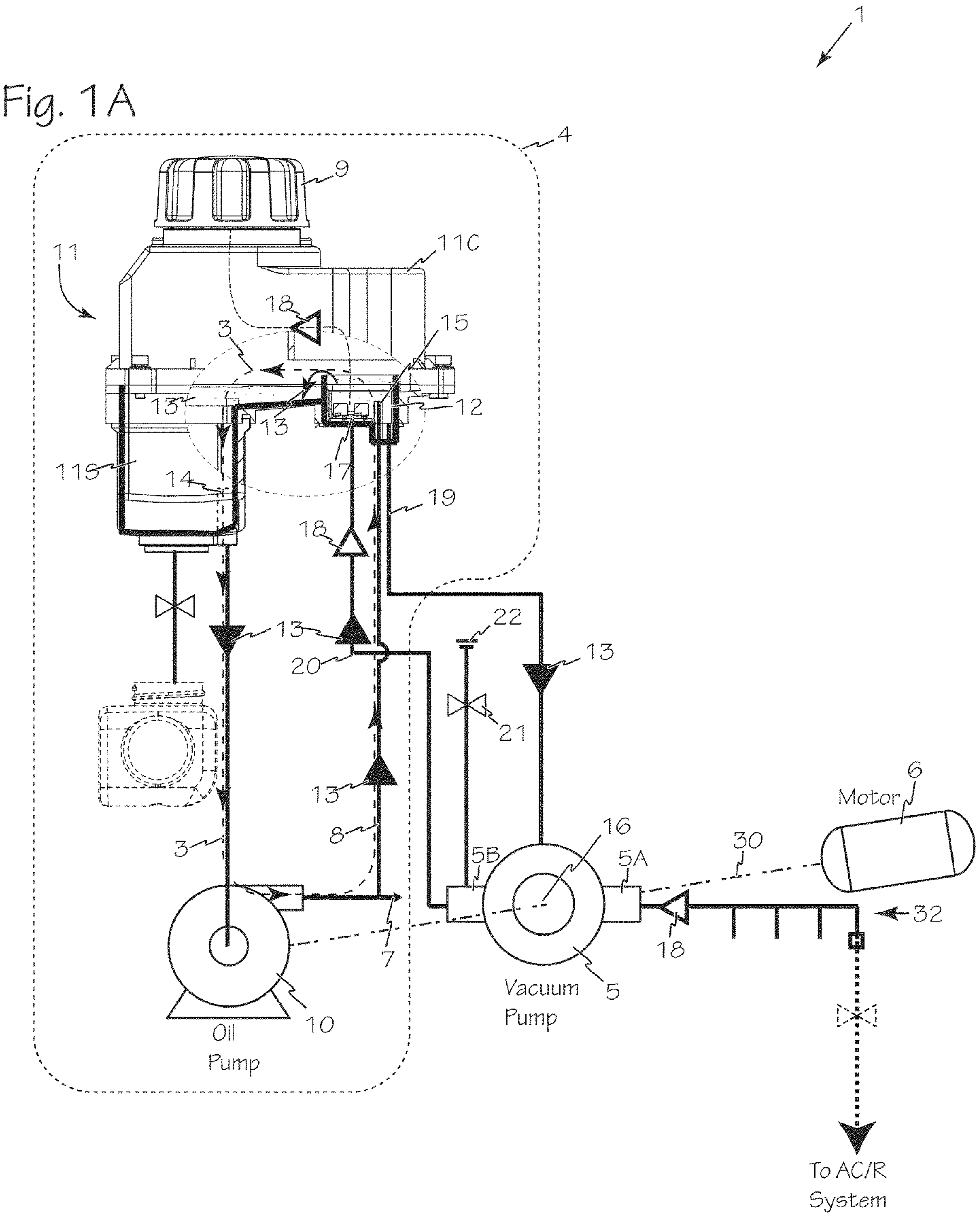
FIG. 1A is a schematic of the oil management system of a vacuum pump system showing flow paths when the vacuum pump is operating.
Figure 5A:
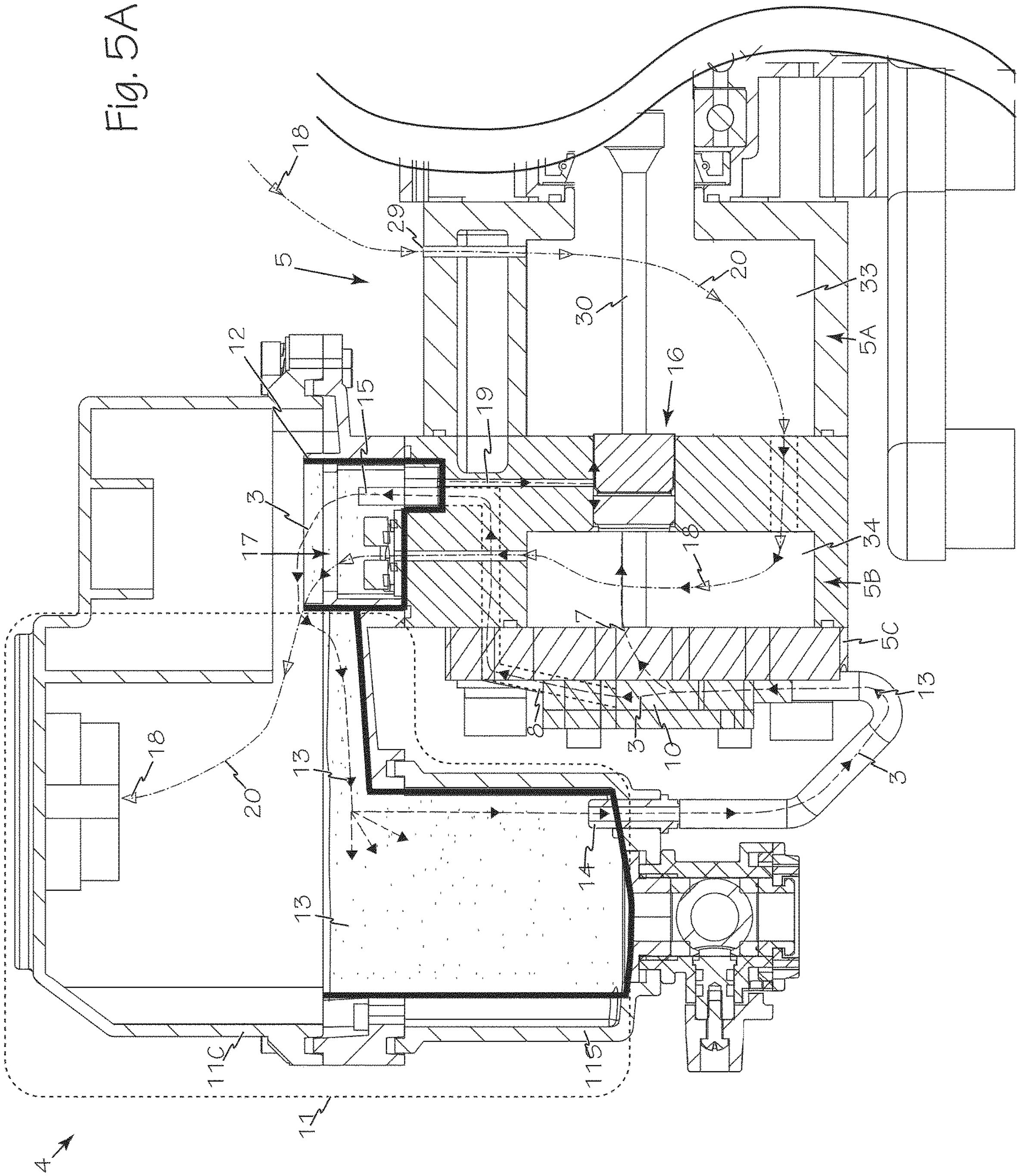
FIG. 5A is a side cross-section view of the oil management system and vacuum pump FIG. 4 taken along A-A showing oil and gas flow paths when the vacuum pump is operating.

FIG. 1A illustrates a schematic for vacuum pump system 1 with oil management system 4, vacuum pump 5 and motor 6. The oil management system 4 includes oil pump 10 in fluid communication with primary oil reservoir 11 and oil change reservoir 12. The primary oil reservoir 11 is formed by oil sump 11S joined to oil reservoir cover 11C. The oil 13 moves through the oil management system starting from the primary oil reservoir 11. Oil 13 is drawn into oil pump 10 from the reservoir outlet or port 14 by the action of oil pump 10 and the oil is pumped through oil conduit 8, also shown in FIG. 5A, to oil discharge port 15 and into oil change reservoir 12 and the oil moving into oil change reservoir 12 overflows the oil change reservoir and flows into primary oil reservoir 11 completing oil flow path 3. Oil flow path 3 is isolated from the lubrication flow path of oil 13 through optional oil flow path 7 and oil channel, line, conduit or passage 19. Optionally, the oil 13 may be pumped into the vacuum pump bearings 16 and/or into first and second pump stages, stages 5A and 5B respectively, along optional oil path 7 and the oil will be forced into the oil change reservoir through exhaust ports 17 along with the contents of the AC/R system, gas 18. Optionally, oil 13 may be pumped from the oil pump 10 into oil change reservoir 12 and pumped into the first vacuum pump stage 5A and/or second vacuum pump stage 5B and/or into vacuum pump bearings such as bearings 16. Oil 13 in the oil change reservoir 12 is also drawn into the vacuum pump bearings 16 through oil line or passage 19 which is also illustrated in FIG. 5A. The oil for sealing and lubricating the vacuum pump is drawn into the pump through the bearings 16 and then into pump first stage 5A and pump second stage 5B by the vacuum in each of the stages. In the vacuum pump volutes, the oil 13 is entrained in gas flow 20 along with gas 18 which is forced into the oil change reservoir through exhaust port 17. Gas 18 exits the oil reservoir via the vent cap. Both primary oil reservoir 11 and oil change reservoir 12 are open to ambient air through vent cap 9.

Gas ballast valve 21 is operably connected between vent 22 and vacuum pump second stage 5B to control contaminants entrained in gas 18, specifically to limit water vapor condensation and prevent oil degradation, during the early stages of the process of drawing a vacuum on an AC/R system.

Figure 2:
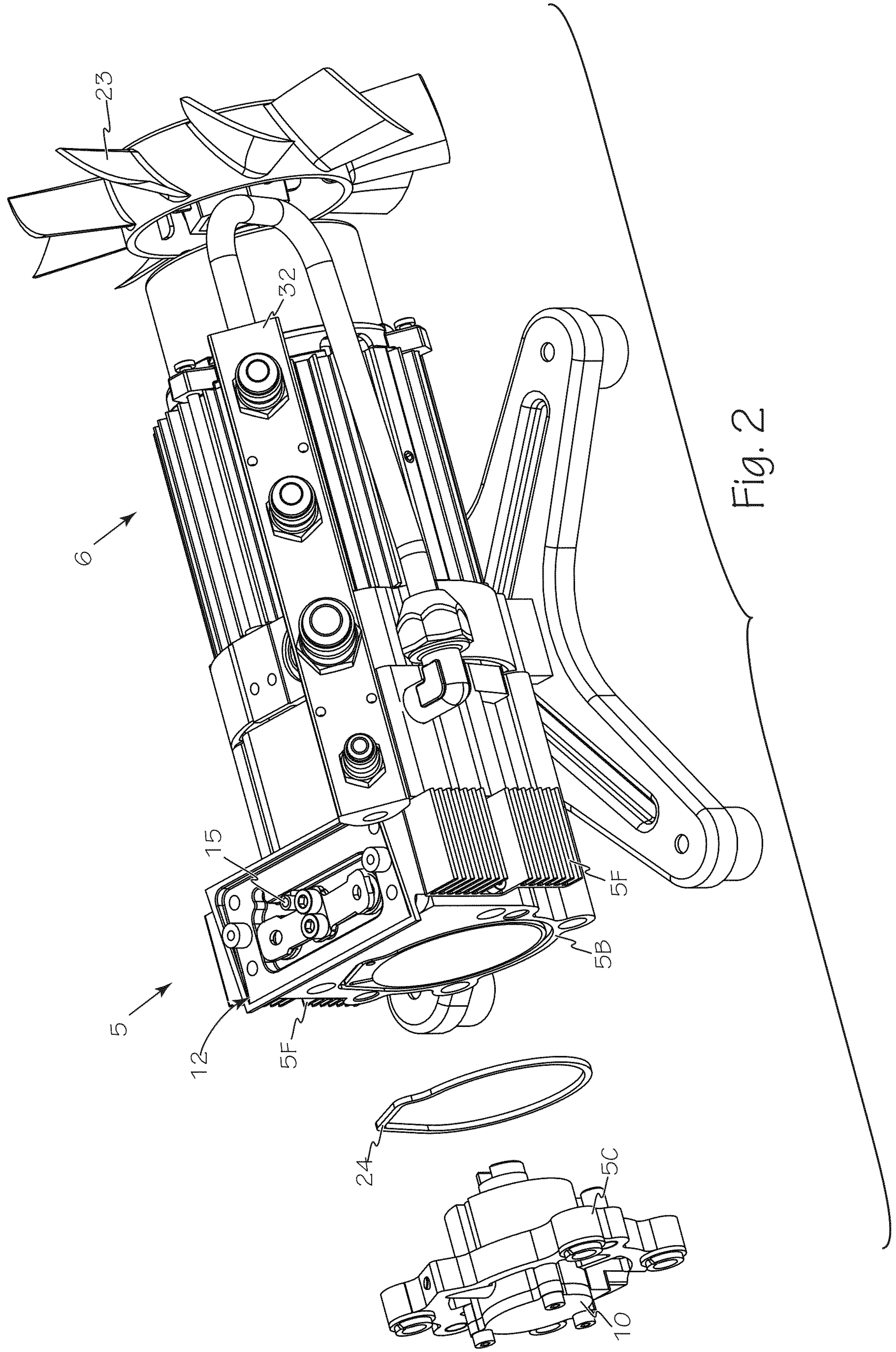
FIG. 2 is a left-front perspective view of the vacuum pump and motor of the vacuum pump system of FIG. 1.
Figure 3:
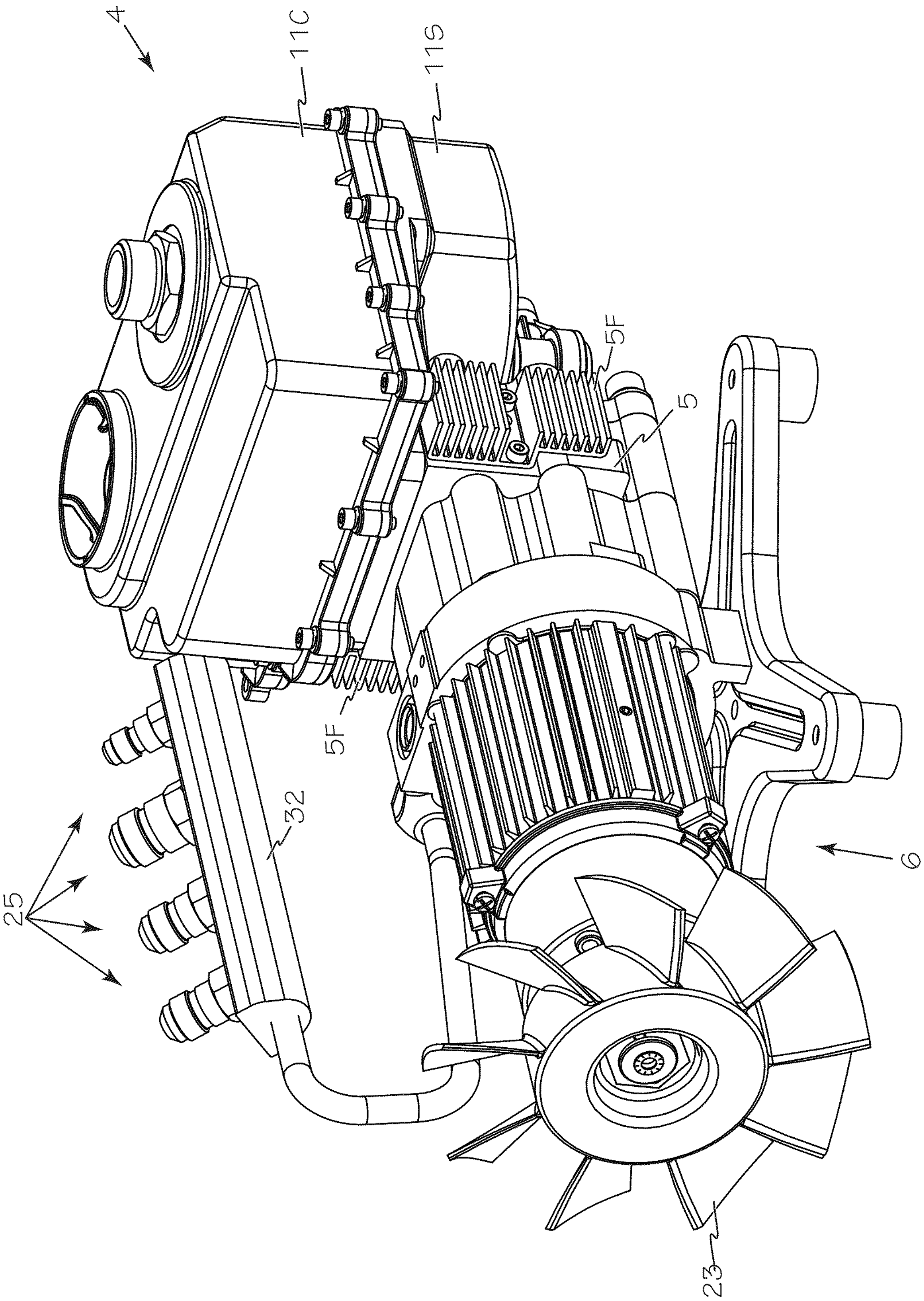
FIG. 3 is a right-rear perspective view of the vacuum pump and motor of the vacuum pump system of FIG. 1.
Figure 4:
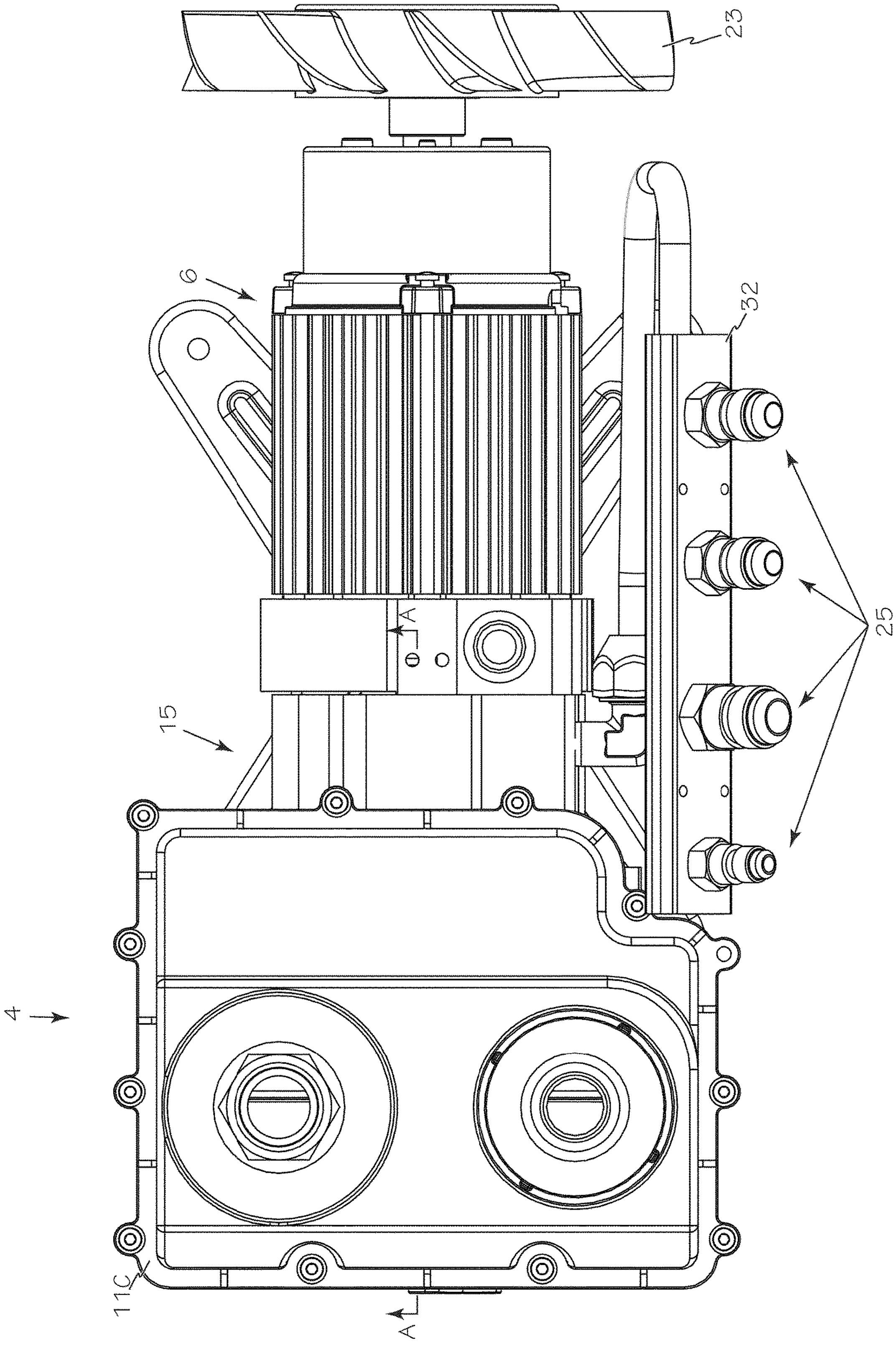
FIG. 4 is a top elevation view of the vacuum pump and motor of the vacuum pump system of FIG. 1.
Figure 5B:
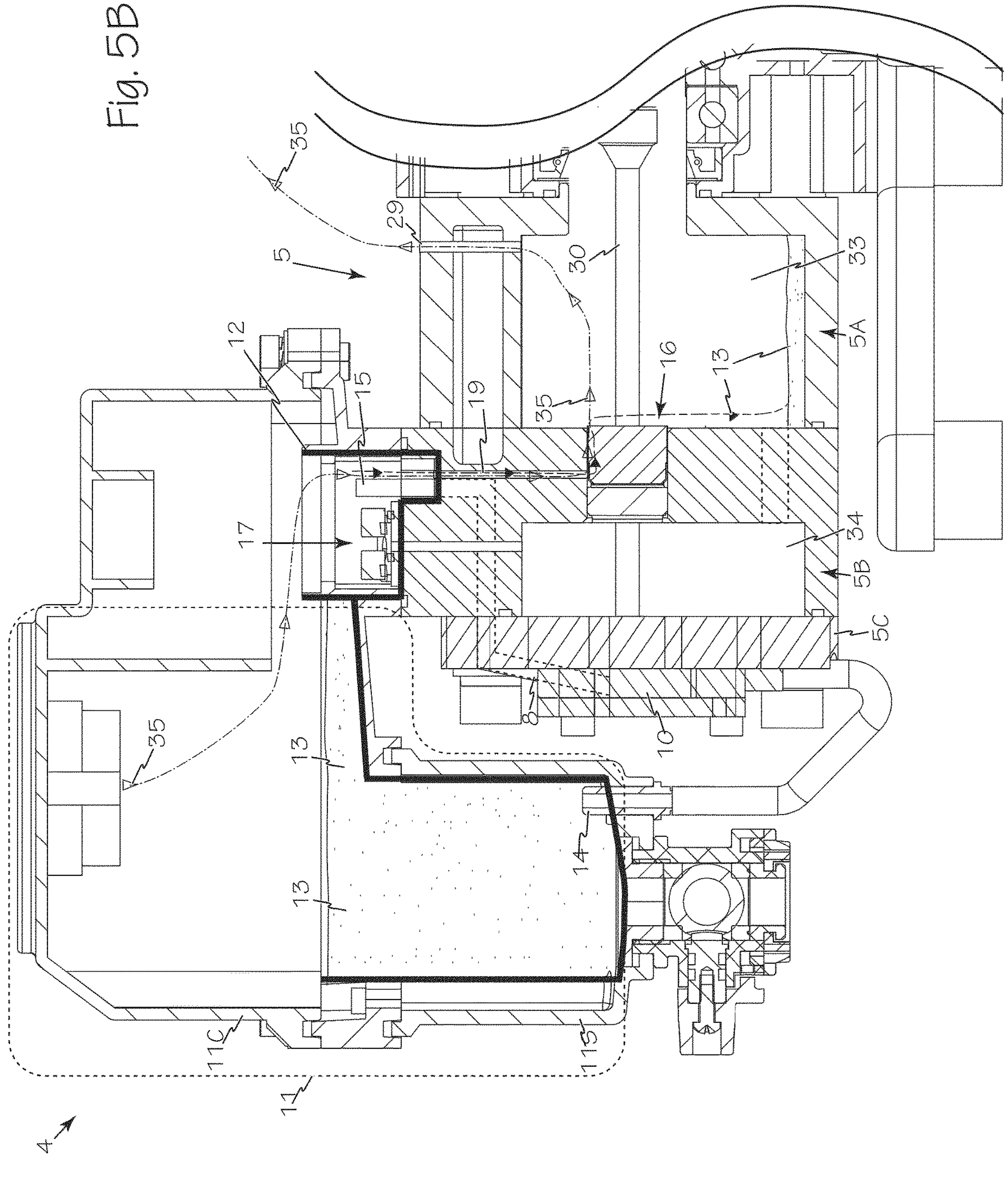
FIG. 5B is a side cross-section view of the oil management system and vacuum pump FIG. 4 taken along A-A showing oil and gas flow paths when the vacuum pump is off with a vacuum connected to the inlet.

FIGS. 2 through 4 along with FIGS. 5A and 5B illustrate the vacuum pump 5 operably connected to the motor 6. Vacuum pump 5 is preferably a two-stage, air-cooled pump relying on air moved by the fan 23 to cool the heat dissipation fins 5F. Any suitable vacuum pump may be used. Vacuum pump 5 includes multiple sealing elements, gaskets and O-rings such as O-ring 24 between second stage pump cap 5C and the pump body 5B, to seal the pump instead of relying on oil immersion. Manifold 32 include inlet ports 25. FIGS. 2 and 5A illustrate the oil change reservoir 12 that is sized to contain enough oil to enable vacuum pump system 1 to operate for at least 2 minutes if the oil in oil management system 4 is being removed and refilled during operation.

FIG. 5A is a side cross-section view of the oil management system and vacuum pump FIG. 4 taken along A-A showing oil and gas flow paths when the vacuum pump is operating.

FIG. 5B is a side cross-section view of the oil management system and vacuum pump FIG. 4 taken along A-A showing oil and gas flow paths when the vacuum pump is off with a vacuum connected to the inlet.

Figure 1B:
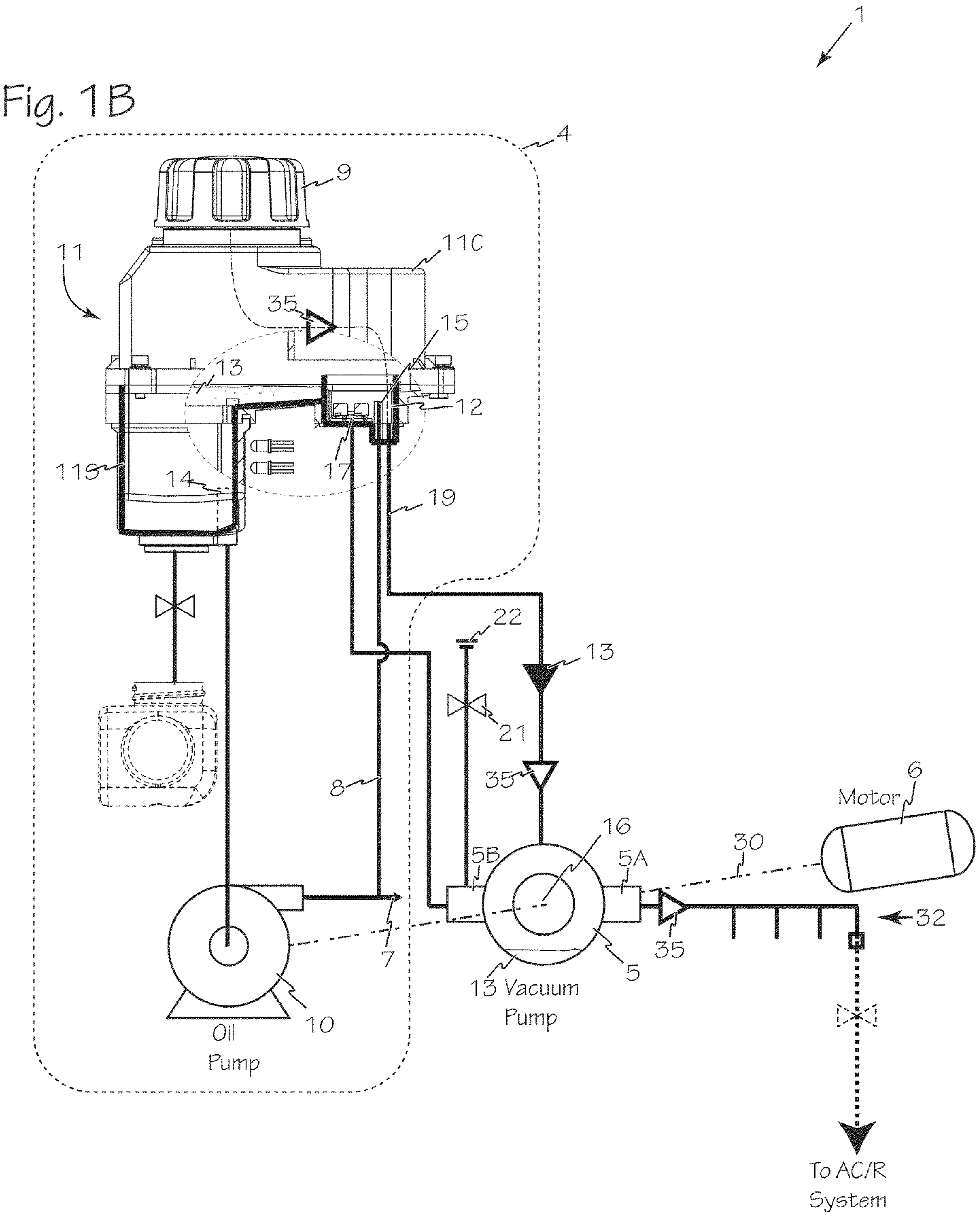
FIG. 1B is a schematic of the oil management system of the vacuum pump system of FIG. 1 showing flow paths when the vacuum pump is off with a vacuum connected to the inlet.

The vacuum pump system 1 is configured to provide oil contamination protection to any AC/R systems evacuated by vacuum pump system 1 as illustrated in FIGS. 1B and 5B. The vacuum inlet that connects to the vacuum pump or the first stage of the vacuum pump in a multistage pump, vacuum inlet 29, is oriented above drive shaft 30 to prevent oil 13 that is vacuumed back into the vacuum pump from being drawn into the inlet manifold 32. Inlet manifold 32 is also oriented above the vacuum inlet 29 when vacuum pump system 1 is oriented for use as shown in FIGS. 2, 3 and 4.

When an AC/R system is completely evacuated during normal operation, a valve is closed in the AC/R system to isolate the AC/R system from the vacuum pump and the intervening hoses and manifolds. In the event of an error or fault that results in the pump being stopped while still in fluid communication with an evacuated AC/R system, the vacuum pump system 1 provides a sump area in the vacuum pump volutes for collection of any oil drawn retrograde into the vacuum pump. When vacuum pump system 1 is turned off with an evacuated AC/R system connected to the manifold 32 through one or more inlet ports such as hose connectors 25 and in fluid communication with vacuum pump 5, the oil 13 in the oil change reservoir 12 is drawn by the vacuum through oil passage 19, through the vacuum pump bearings 16 and into the first and second vacuum pump stages, volutes 33 and 34 of the vacuum pump. Given the relatively small volume of the oil change reservoir the oil change reservoir will be empty in a short time. The primary oil reservoir 11 and the inlet oil path are protected from evacuation by oil pump 10. Consequently, once all of the oil 13 from the oil change reservoir 12 is drawn into first stage volute 33, the oil passage 19 and the oil change reservoir 12 will be empty of oil and will be exposed to ambient air 35 and the oil 13 in first stage volute 33 will not be close enough to vacuum inlet 29 to be drawn into the manifold or the AC/R system. After the oil change reservoir 12 is empty, the ambient air 35 will be drawn through the oil reservoir, through the vacuum pump bearings, through the first stage volute and out through vacuum inlet 29 to the evacuated AC system in preference to having oil contaminate the manifold and AC/R system. It is better to have to repeat the evacuation of the AC/R system to reevacuate the air than to have to clear the system of oil.

Figure 6:
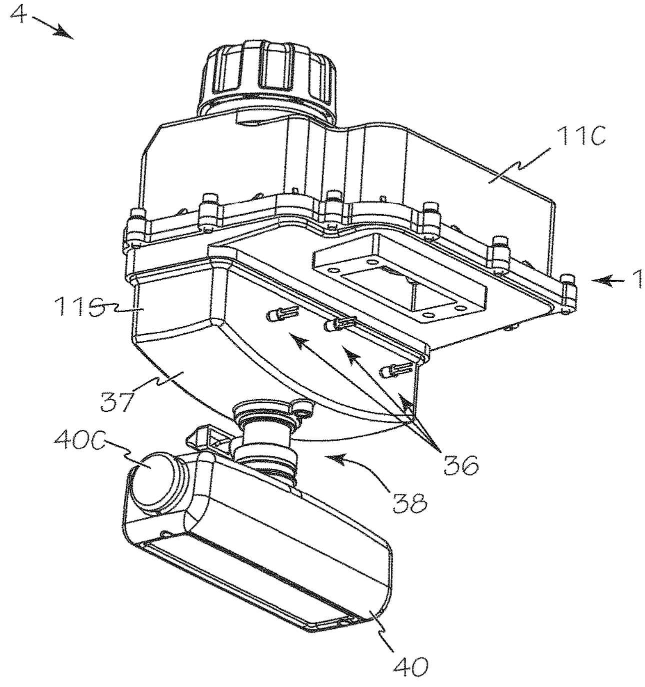
FIG. 6 is a bottom right perspective view of the oil management system of the vacuum pump system of FIG. 1.
Figure 7:
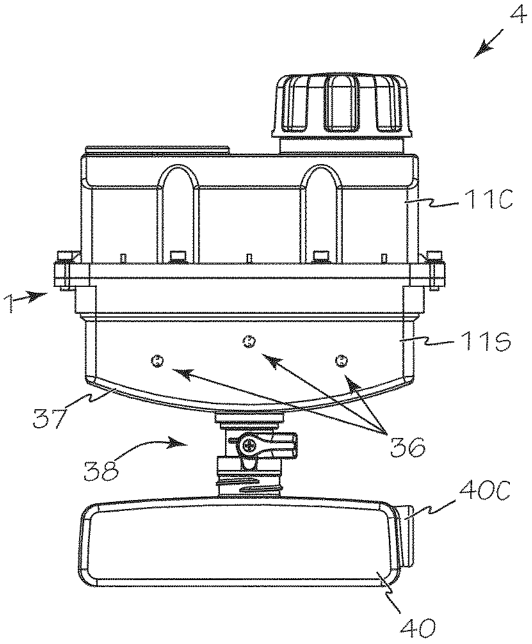
FIG. 7 is a front elevation view of the oil management system of FIG. 6.
Figure 9:
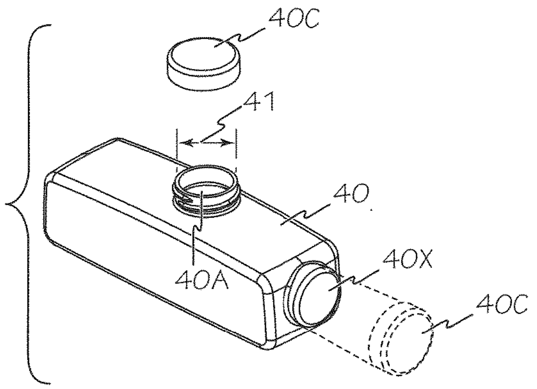
FIG. 9 is a right-front perspective view of the oil fill/dump bottle of the oil management system of FIG. 6.
Figure 8:
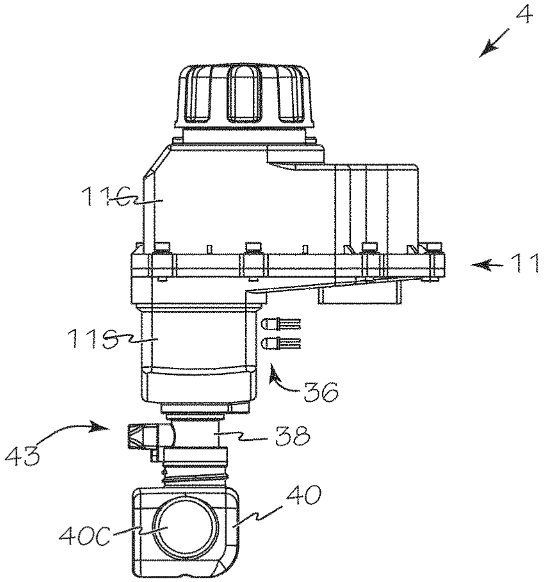
FIG. 8 is a right elevation view of the oil management system of FIG. 6.
Figure 10:
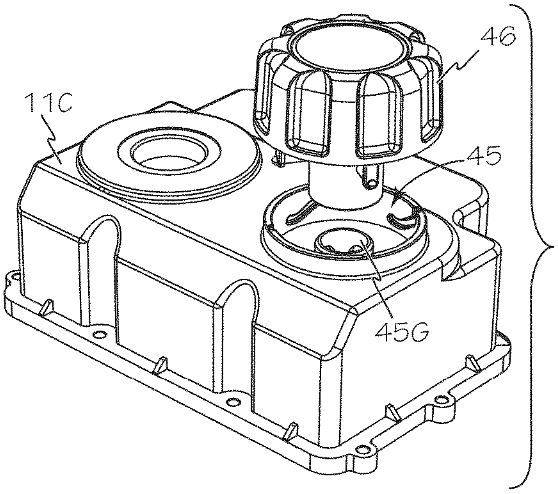
FIG. 10 is a right-front perspective view of the oil fill port of the oil management system of FIG. 6.
Figure 11:
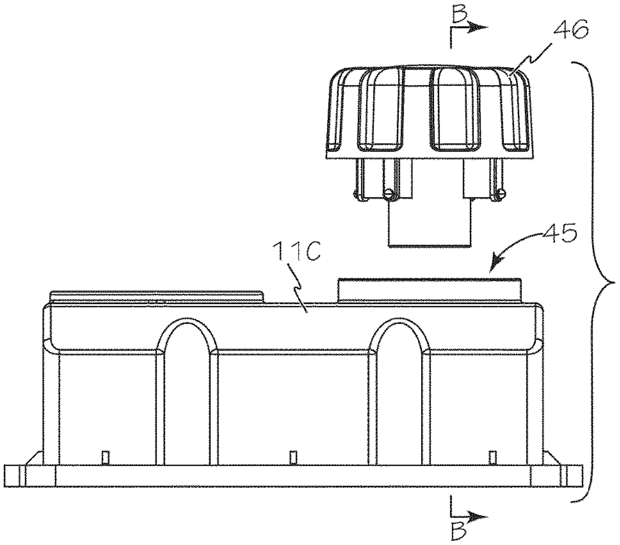
FIG. 11 is a front elevation view of the oil fill port of the oil management system of FIG. 6.
Figure 13:
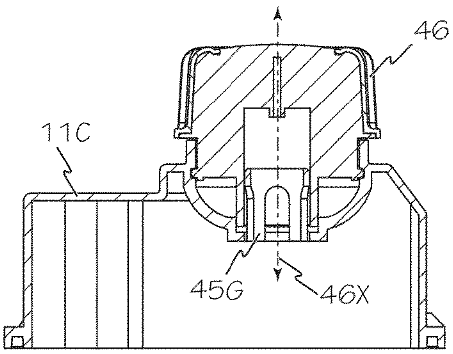
FIG. 13 is the cross-section view of the oil fill port of FIG. 12 with the cap closed.
Figure 12:
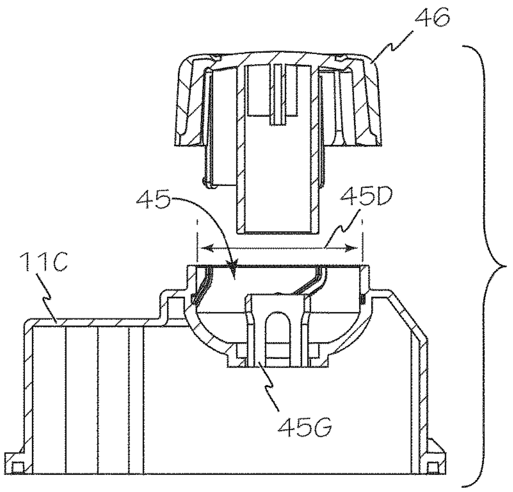
FIG. 12 is a cross-section view of the oil fill port of FIG. 11 taken along B-B.

FIGS. 6 through 8 further illustrate oil management system 4. Oil sump 11S is formed of clear material to enable easy visual confirmation of the condition of the oil 13. Oil management system 4 also includes LEDs 36 oriented to shine through the oil sump to make it easier to view the oil 13. Oil sump 11S has a sloping bottom 37 which is shaped to collect sludge and debris and direct them to drain valve 38 which is sized to enable evacuation of the entire contents of the oil sump very quickly. Oil management system 4 also includes oil bottle 40 which includes opening 40A having a diameter 41 which is sized to engage drain valve 38. Opening 40A is resealable with cap 40C. When cap 40C is removed from the bottle opening it may be stored on cap storage post 40X on a first end of oil bottle 40.

FIGS. 10 through 13 illustrate the details of oil reservoir cover 11C which enables oil reservoir 11 to be quickly and easily refilled via large funnel port 45. Funnel port 45 has an opening diameter 45D which is larger than bottle opening diameter 41 to simplify and speed refilling of the oil system from a bottle of fresh oil. Funnel port 45 also includes guide tower 45G to make it easier to fill the oil system and to engage oil cap 46. Oil cap 46 engages funnel port 45 and guide tower 45G and is configured to fully engage the funnel port with a ⅙ turn about the cap axis 46X.

Figure 14:
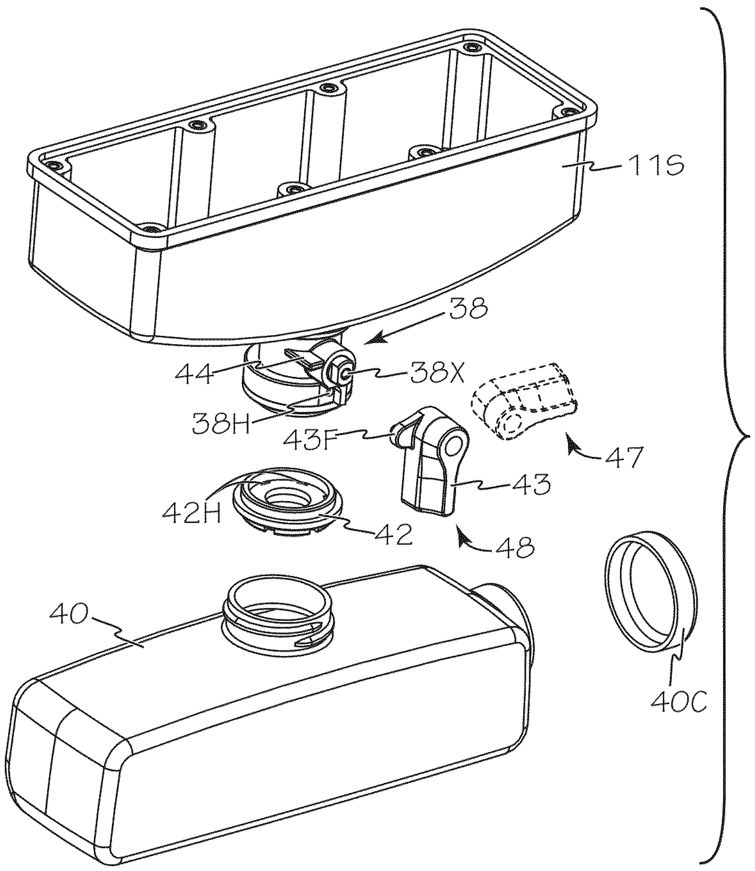
FIG. 14 is an exploded left-front perspective view of the reservoir/drain valve and oil bottle for the oil management system of FIG. 6.

FIG. 14 is an exploded left-front perspective view of the reservoir/drain valve 38 and oil bottle 40 for the oil management system 4. Oil bottle 40 engages reservoir/drain valve 38 through gasket 42. Reservoir/drain valve 38 is controlled using control lever 43 which engages valve shaft 38X. Control lever 43 includes flange 43F which is sized to obstruct vent hole 38H when the valve is closed (control lever 43 in position 47) and to engage control lever stop 44 when the valve is in the open position (control lever 43 in position 48). Gasket 42 includes a plurality of vent holes 42H in fluid communication the inner volume of bottle 40 with vent hole 38H to enable air to exit bottle 40 when the drain valve is opened and oil drains into the drain bottle through gasket 42.

Figure 16:
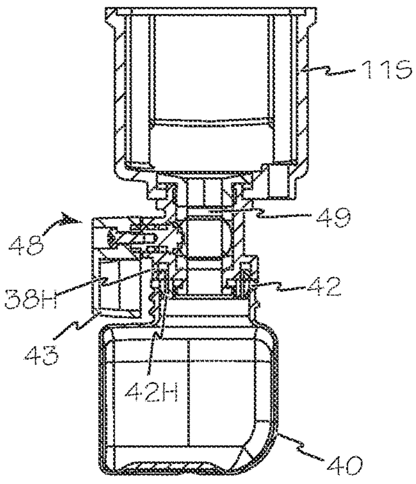
FIG. 16 is a cross-section view of the reservoir/drain valve and oil bottle of FIG. 15 taken along C-C.
Figure 15:
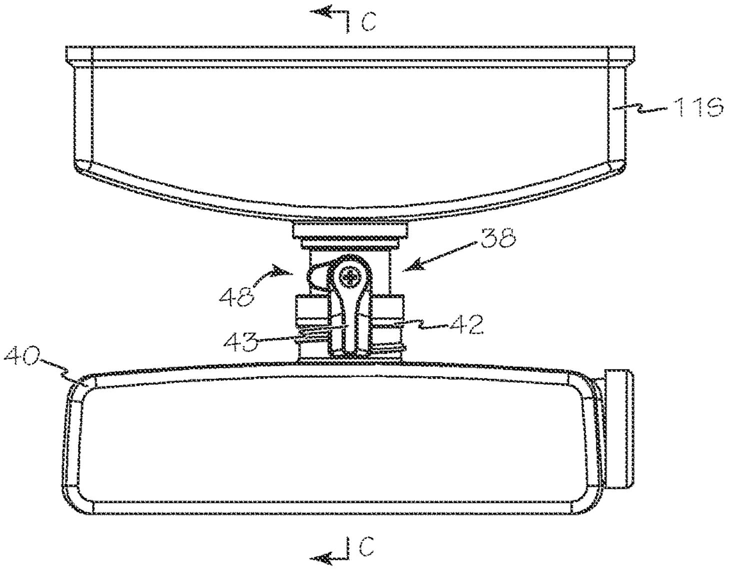
FIG. 15 is a front elevation view of the reservoir/drain valve and oil bottle for the oil management system of FIG. 6 with the drain valve open.
Figure 18:
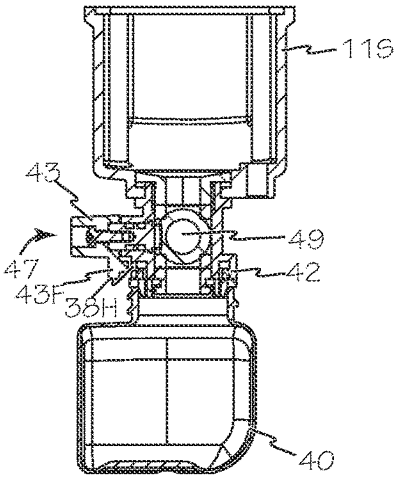
FIG. 18 is a cross-section view of the reservoir/drain valve and oil bottle of FIG. 17 taken along D-D.
Figure 17:
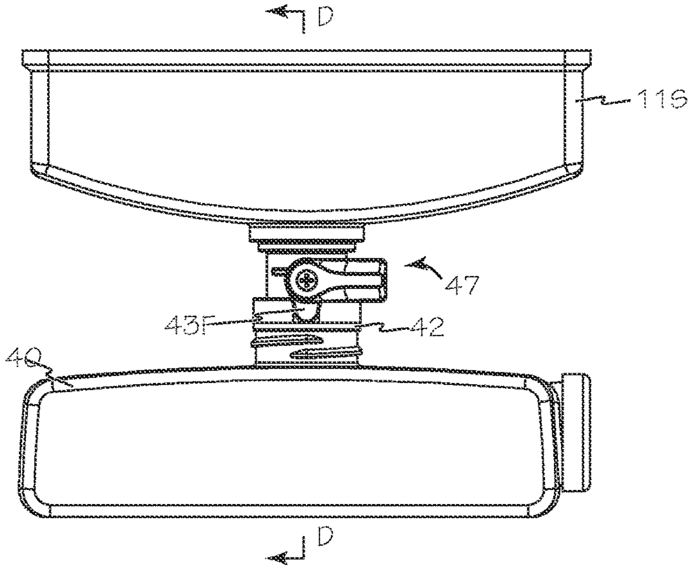
FIG. 17 is a front elevation view of the reservoir/drain valve and oil bottle for the oil management system of FIG. 6 with the drain valve closed.

FIGS. 15 and 16 are elevation and cross-section views, respectively, of the oil sump 11S, drain valve 38 and oil bottle 40 with the drain valve 38 in open position 48. With the drain valve 38 in open position 48 a contiguous channel, a drain channel 49 is formed between oil bottle 40 and oil sump 11S to drain the oil from the primary reservoir into the oil bottle. Simultaneously, air within the oil bottle is permitted to escape through gasket vent holes 42H to valve vent hole 38H. FIGS. 17 and 18 are elevation and cross-section views respectively of the oil sump, drain valve and oil bottle with the drain valve 38 in closed position 47. With the drain valve 38 in closed position 47, the drain channel 49 is closed and valve vent hole 38H is blocked by control lever flange 43F.

Figure 21:
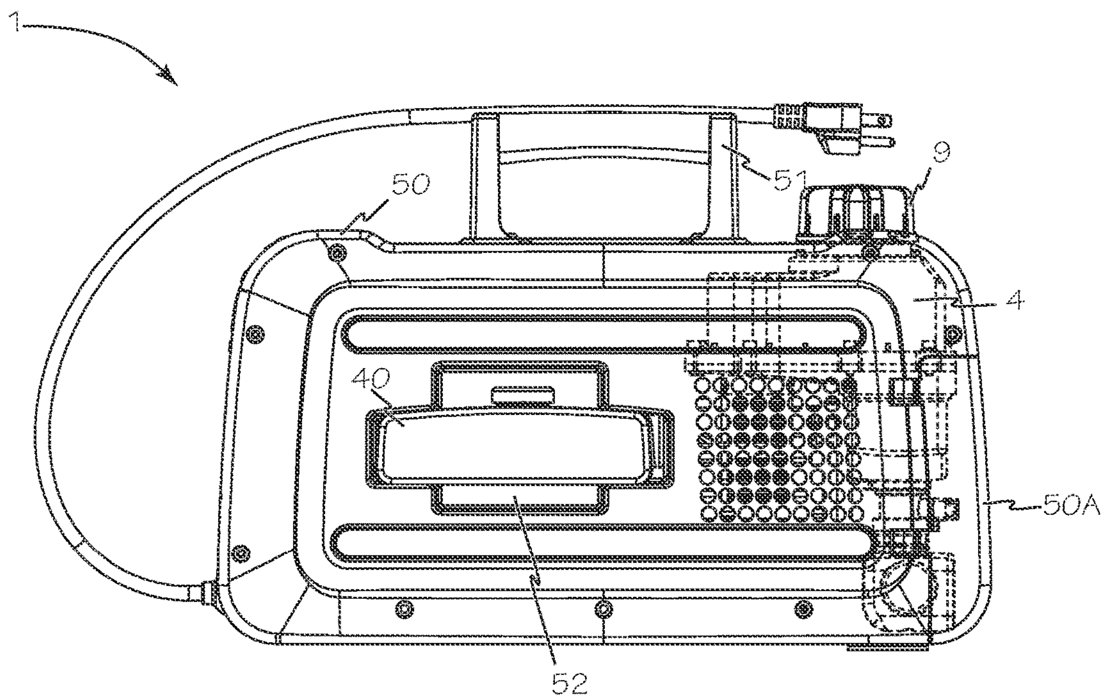
FIG. 21 is an elevation view of the back of the vacuum pump system of FIG. 1.
Figure 22:
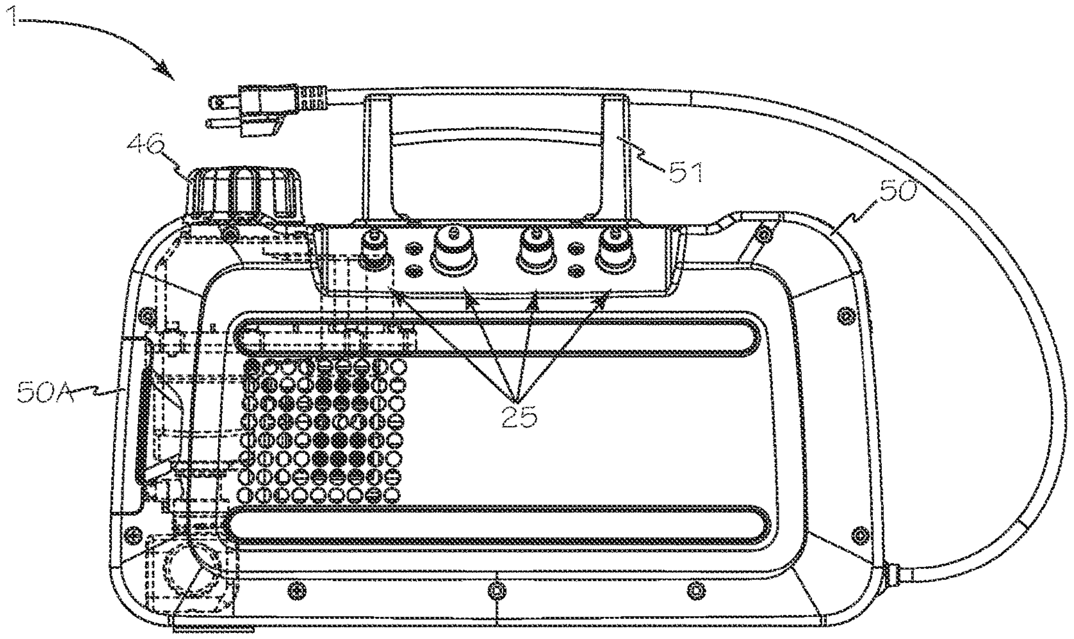
FIG. 22 is an elevation view of the front of the vacuum pump system of FIG. 1.
Figure 23:
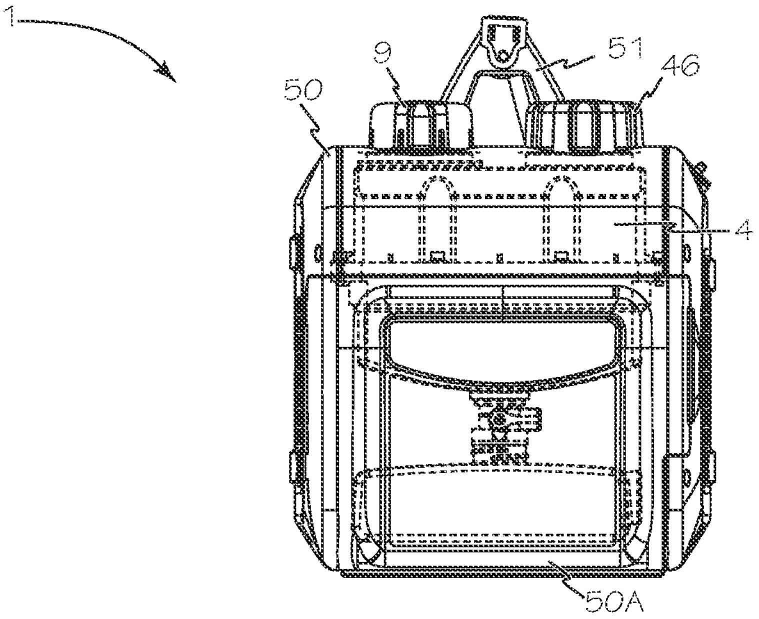
FIG. 23 is an elevation view of the left side of the vacuum pump system of FIG. 1.
Figure 24:
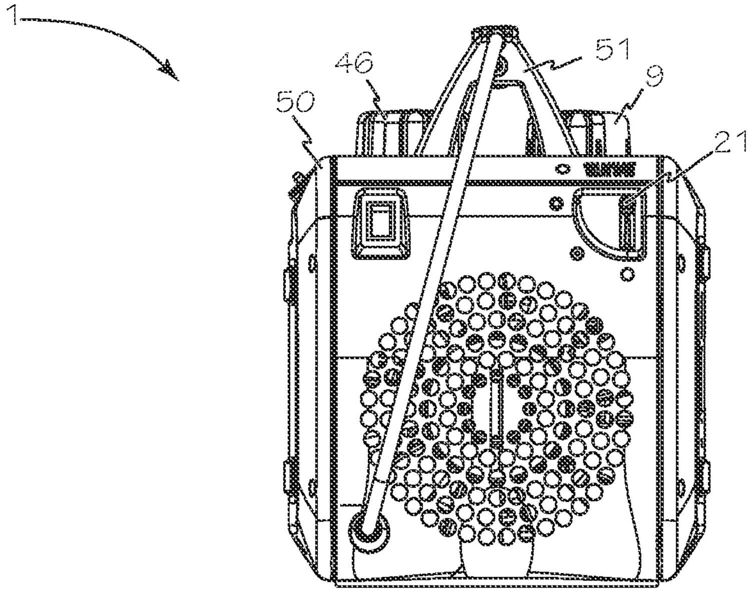
FIG. 24 is an elevation view of the right side of the vacuum pump system of FIG. 1.
Figure 25:
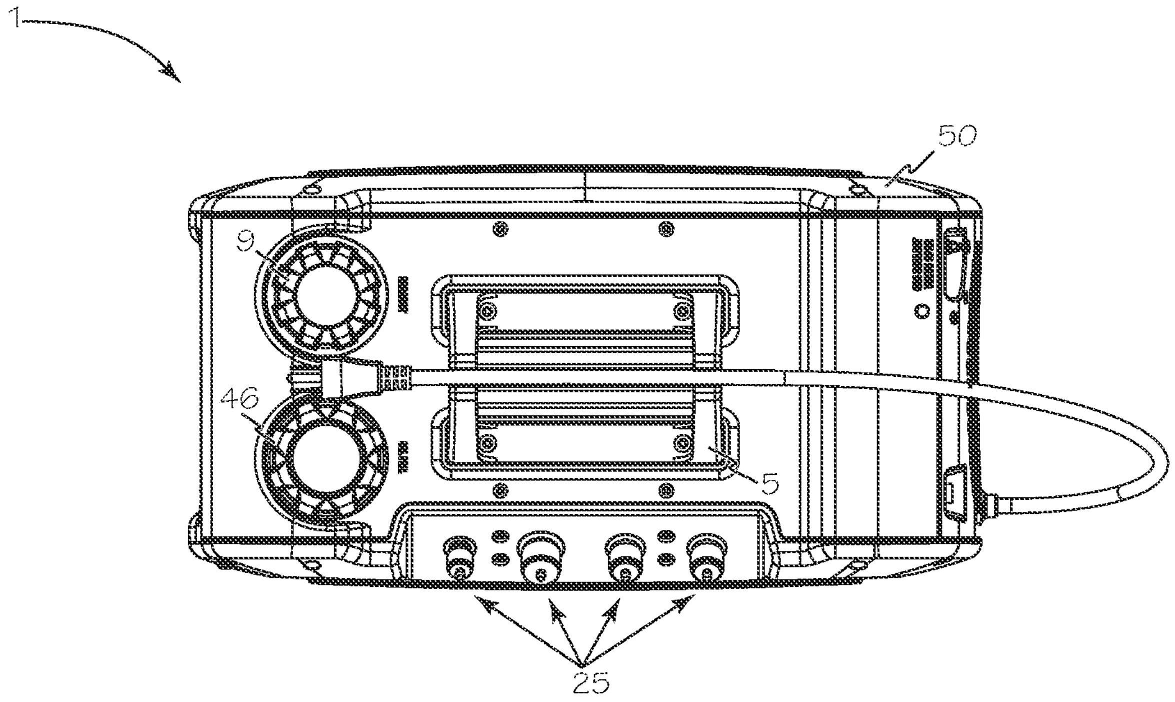
FIG. 25 is an elevation view of the top of the vacuum pump system of FIG. 1.
Figure 26:
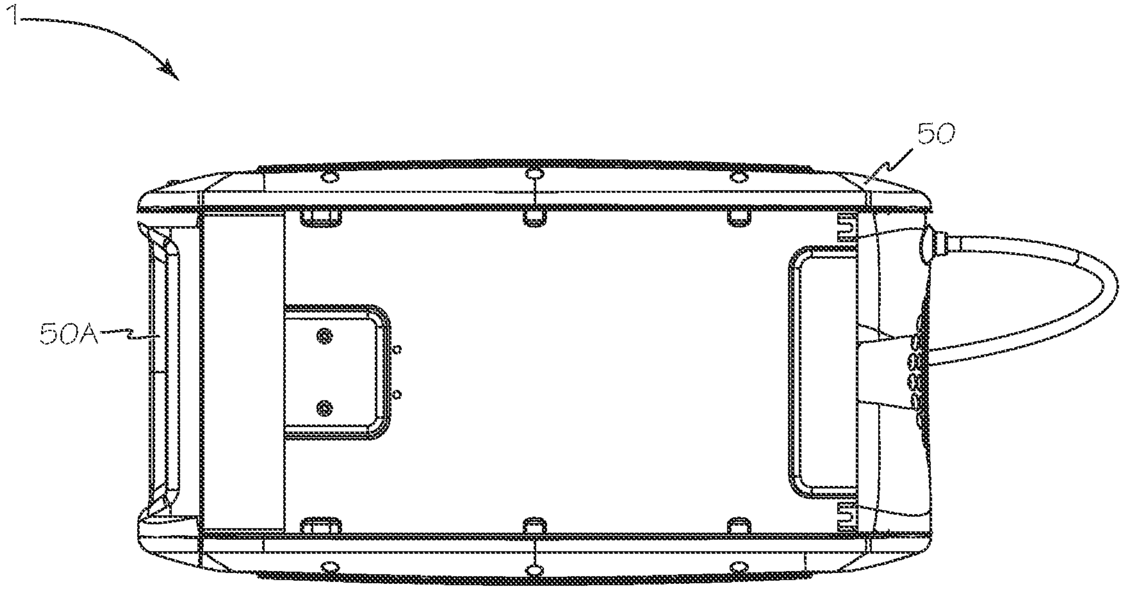
FIG. 26 is an elevation view of the bottom of the vacuum pump system of FIG. 1.
Figure 27:
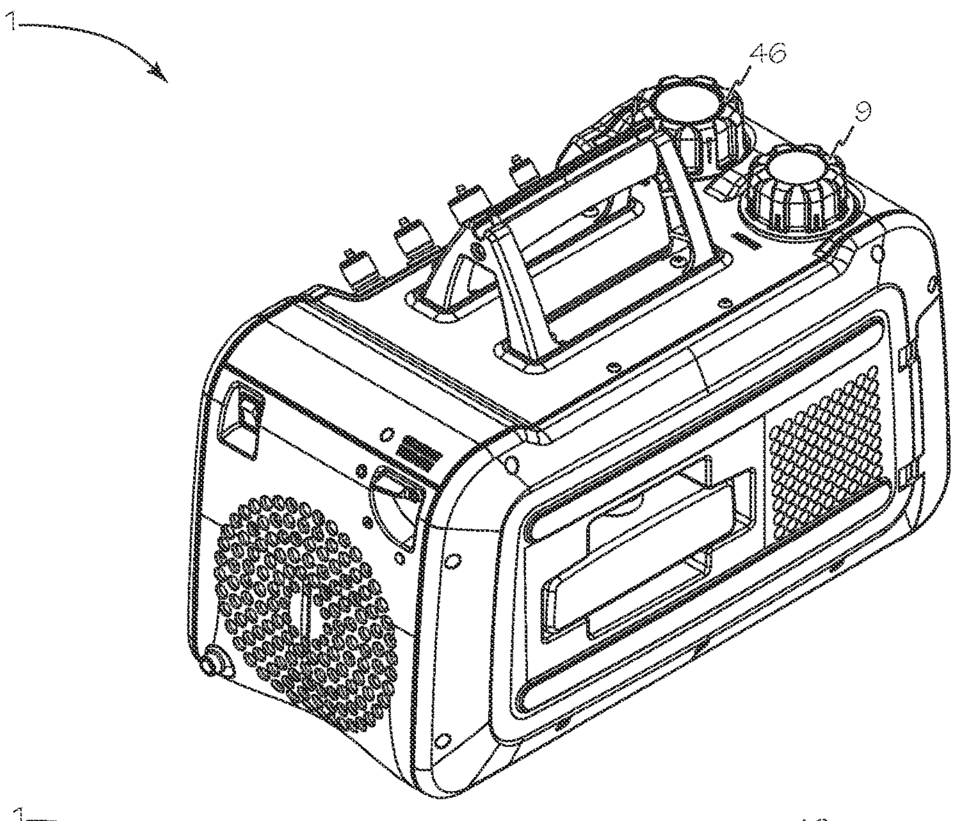
FIG. 27 is left-back perspective view of the vacuum pump system of FIG. 1.
Figure 28:
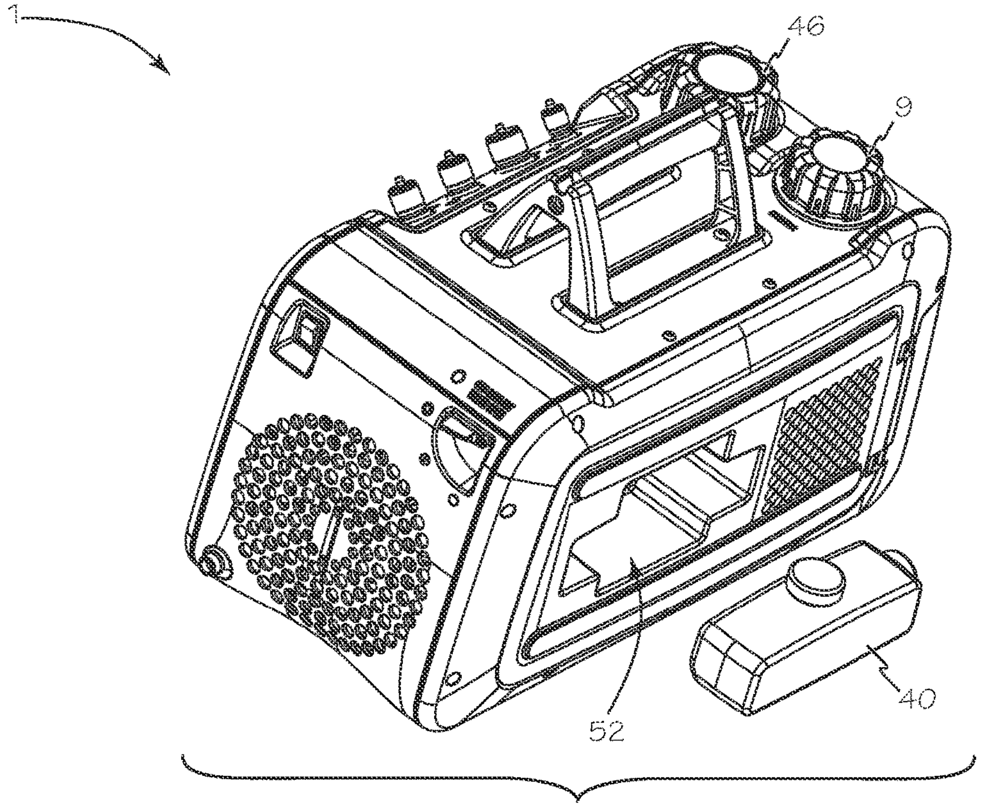
FIG. 28 is a right-back perspective view of the vacuum pump system of FIG. 1.

FIGS. 19 through 28 provide views of the vacuum pump system 1 illustrating the access or oil management door 50A in housing 50 for accessing the oil management system 4. The hose connectors 31, the cord storage handle 51 and the gas ballast valve 21 are also illustrated. FIG. 21 provides a view of the back of vacuum pump system 1 showing the oil storage recess 52 that is sized to frictionally engage the oil bottle 40.

Figure 19:
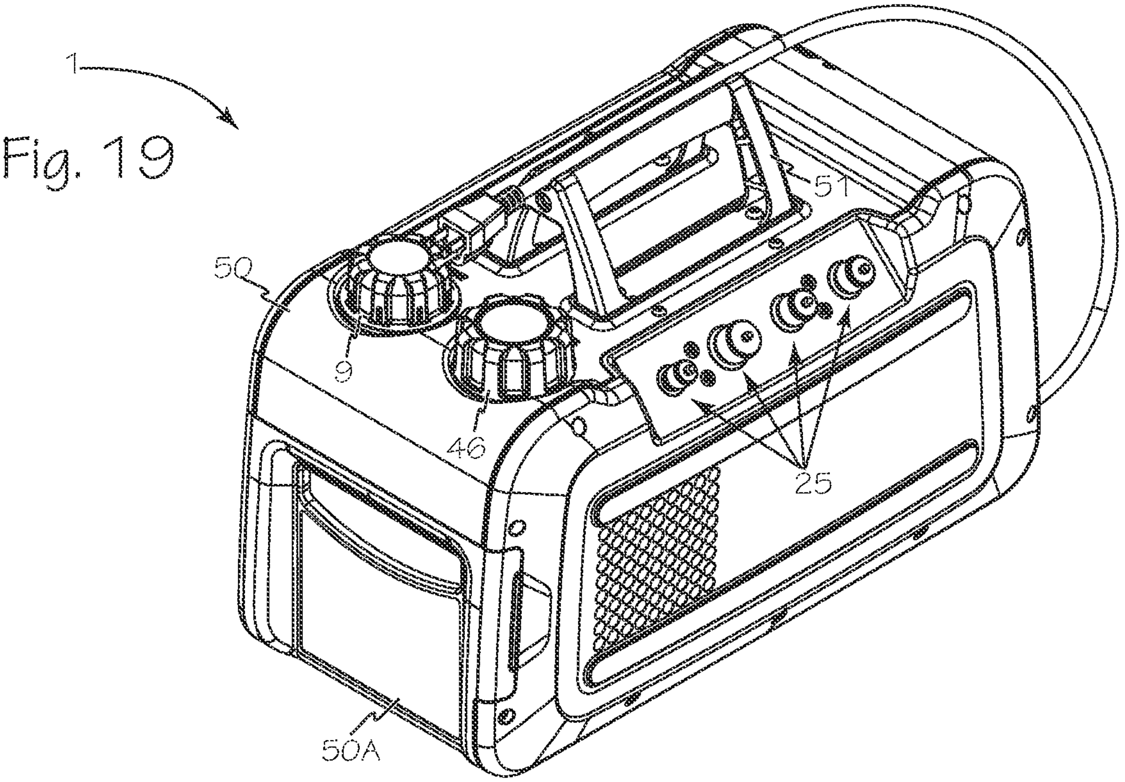
FIG. 19 is a left-front perspective view of the vacuum pump system of FIG. 1.
Figure 20:
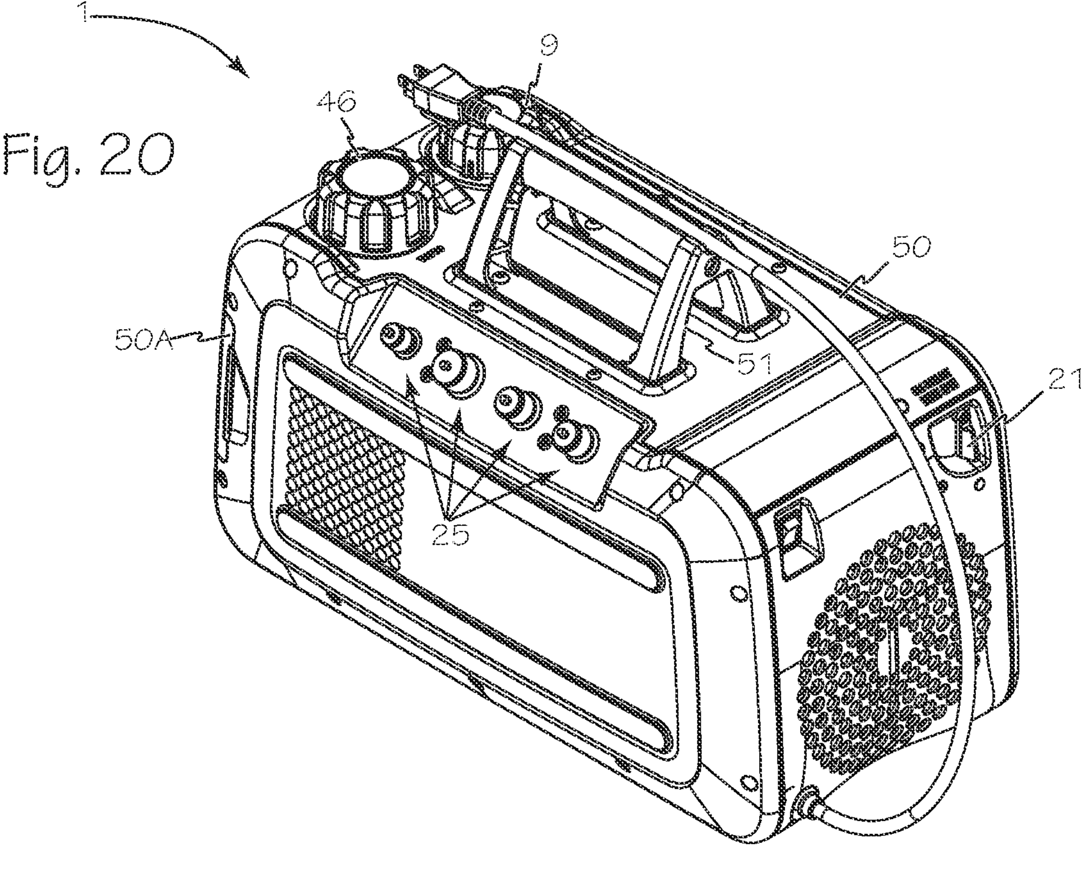
FIG. 20 is a right-front perspective view of the vacuum pump system of FIG. 1.
Figure 29:
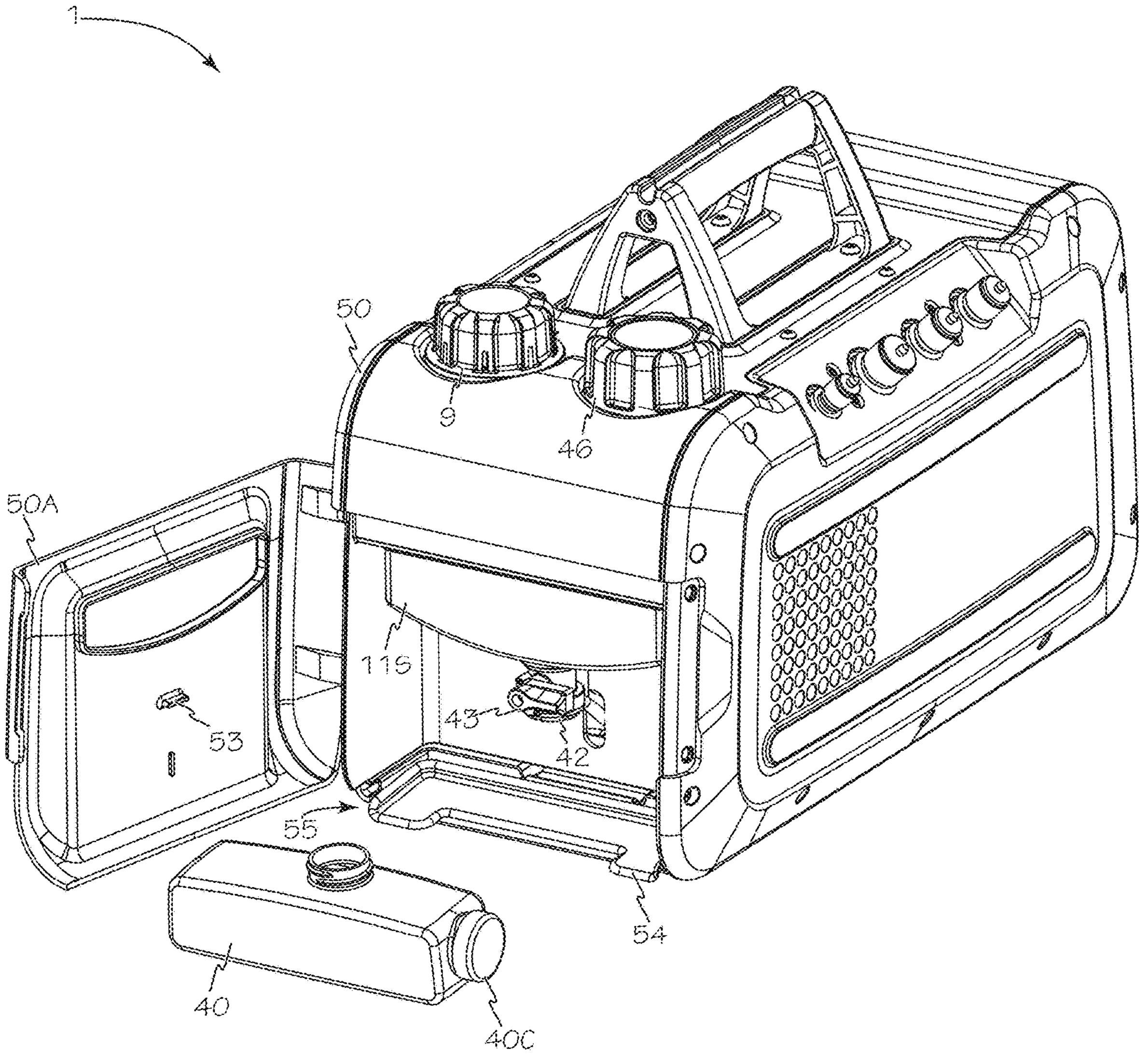
FIG. 29 is a left front perspective view of the vacuum pump system of FIG. 1 configured for use with the oil management door open and the oil bottle open.

FIGS. 29 through 33 illustrate the preferred steps for changing the oil in vacuum pump system 1. FIG. 29 illustrates a perspective view of the vacuum pump system of FIG. 19 configured for use with oil management door 50A open and oil bottle 40 is empty, open and ready for insertion. Oil management door 50A includes drain safety post 53 which is oriented correspond to the orientation of control lever 43 when valve 38 is in closed position 47 and allow door 50A to close completely as illustrated in FIG. 19. With vacuum pump system 1 configured as illustrated, the oil bottle support platform 54 is inclined against one or more biasing springs into open position 55 to allow insertion of the oil bottle between support platform 54 and the drain valve gasket 42.

Figure 30:
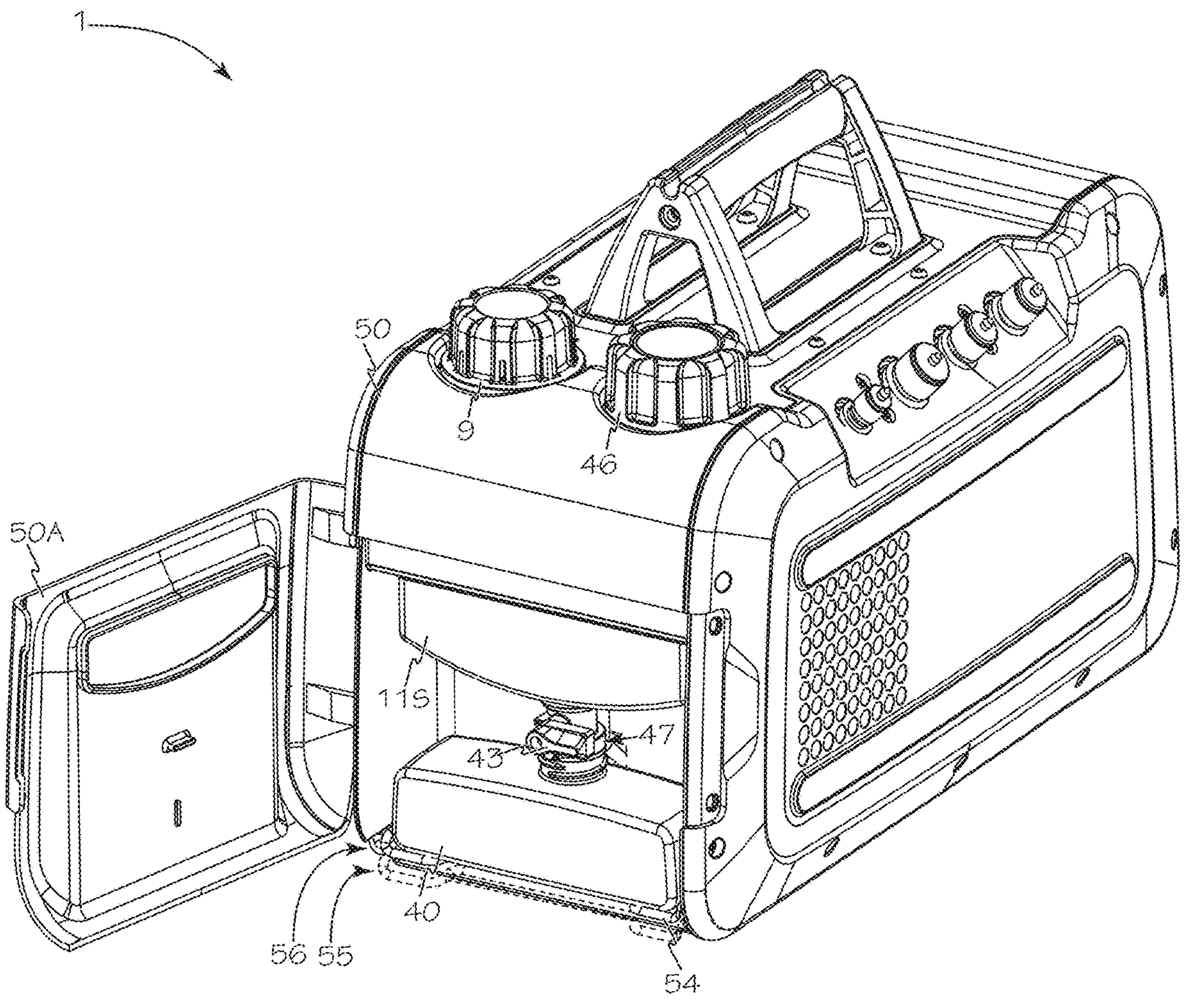
FIG. 30 is a left front perspective view of the vacuum pump system of FIG. 1 configured for use with the oil management door open and the oil bottle engaging the drain valve and the valve closed.

As illustrated in FIG. 30, in the next step in the process of changing oil, support platform 54 is moved from the open position 55 to the closed or raised position 56 and oil bottle 40 is engaging the closed drain valve 38.

Figure 31:
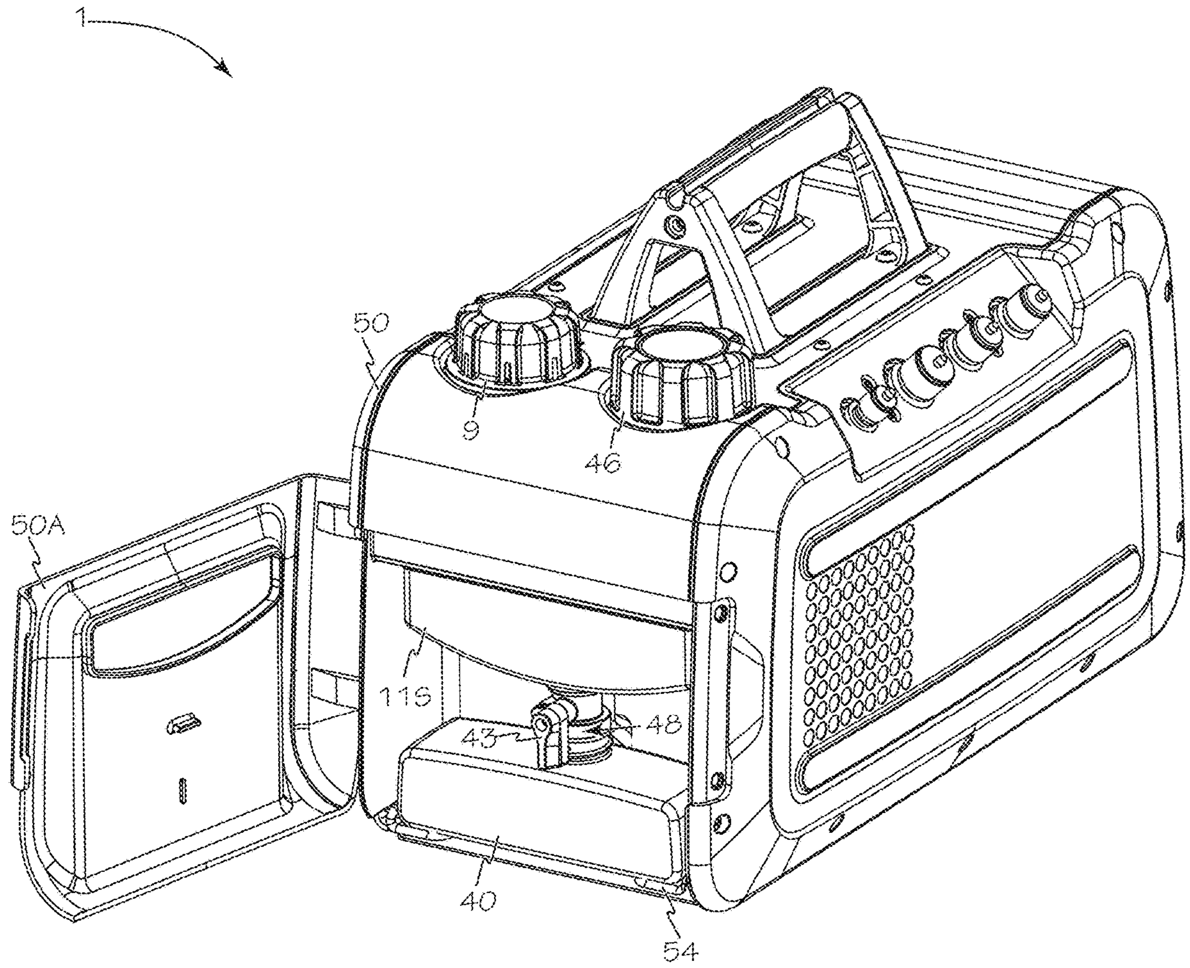
FIG. 31 is a left front perspective view of the vacuum pump system of FIG. 1 configured for use with the oil management door open and the oil bottle engaging the drain valve and the valve open.

As illustrated in FIG. 31 drain valve 38 is rotated into open position 48 causing the oil 13 in oil sump 11S to drain into oil bottle 40. As discussed above, this step may be performed with vacuum pump system 1 operating because sufficient oil will remain in oil change reservoir 12 illustrated in FIGS. 2, 5A and 5B.

Figure 32:
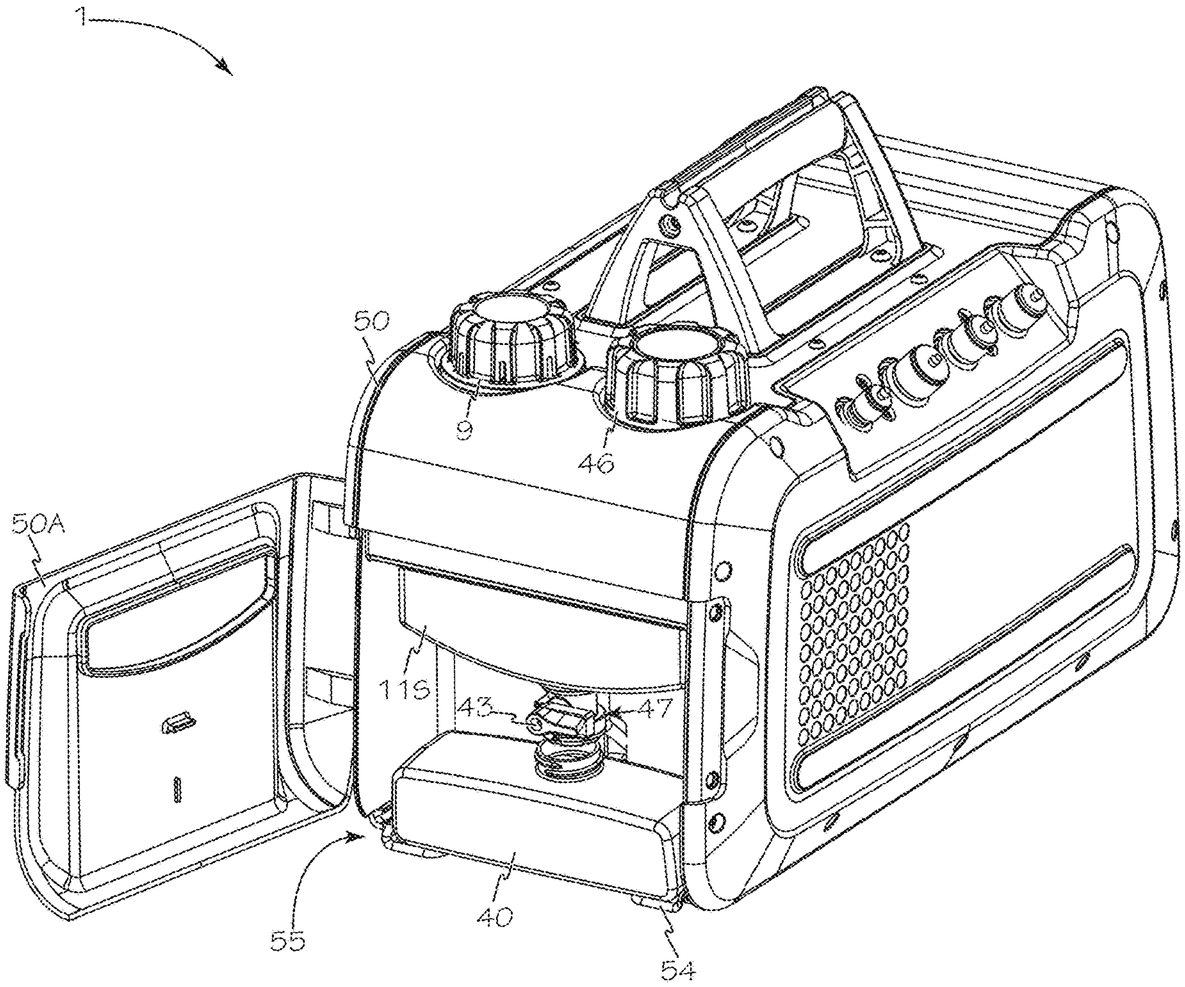
FIG. 32 is a left front perspective view of the vacuum pump system of FIG. 1 configured for use with the oil drain valve closed and the spring loaded platform depressed to release the oil bottle.

The next step in the process of changing oil is illustrated in FIG. 32. Oil drain valve 38 is rotated into closed position 47 and the spring loaded platform 54 is depressed into the open or lower position 55 to release the oil bottle 40 from engagement with the drain valve 38.

Figure 33:
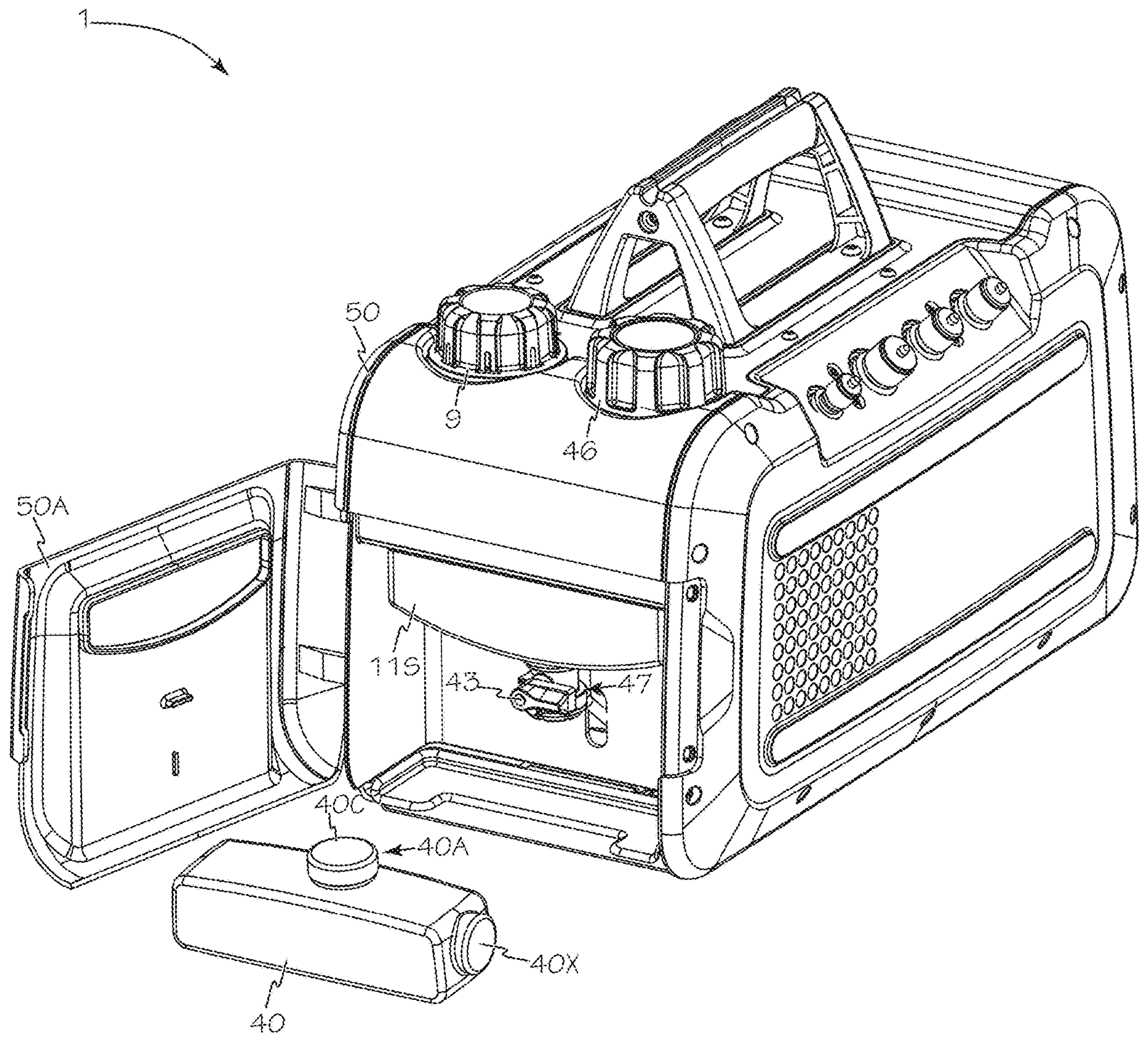
FIG. 33 is a left front perspective view of the vacuum pump system of FIG. 1 configured for use with the oil drain valve closed and the oil bottle removed and capped.

As illustrated in FIG. 33 the next step in the process of changing oil is to remove oil bottle 40 from the support platform. Oil bottle cap 40C is removed from cap storage post 40X and engages and seals opening 40A. With oil bottle 40 removed, the spring loaded platform 54 returns to its raised position 56.

Figure 34:
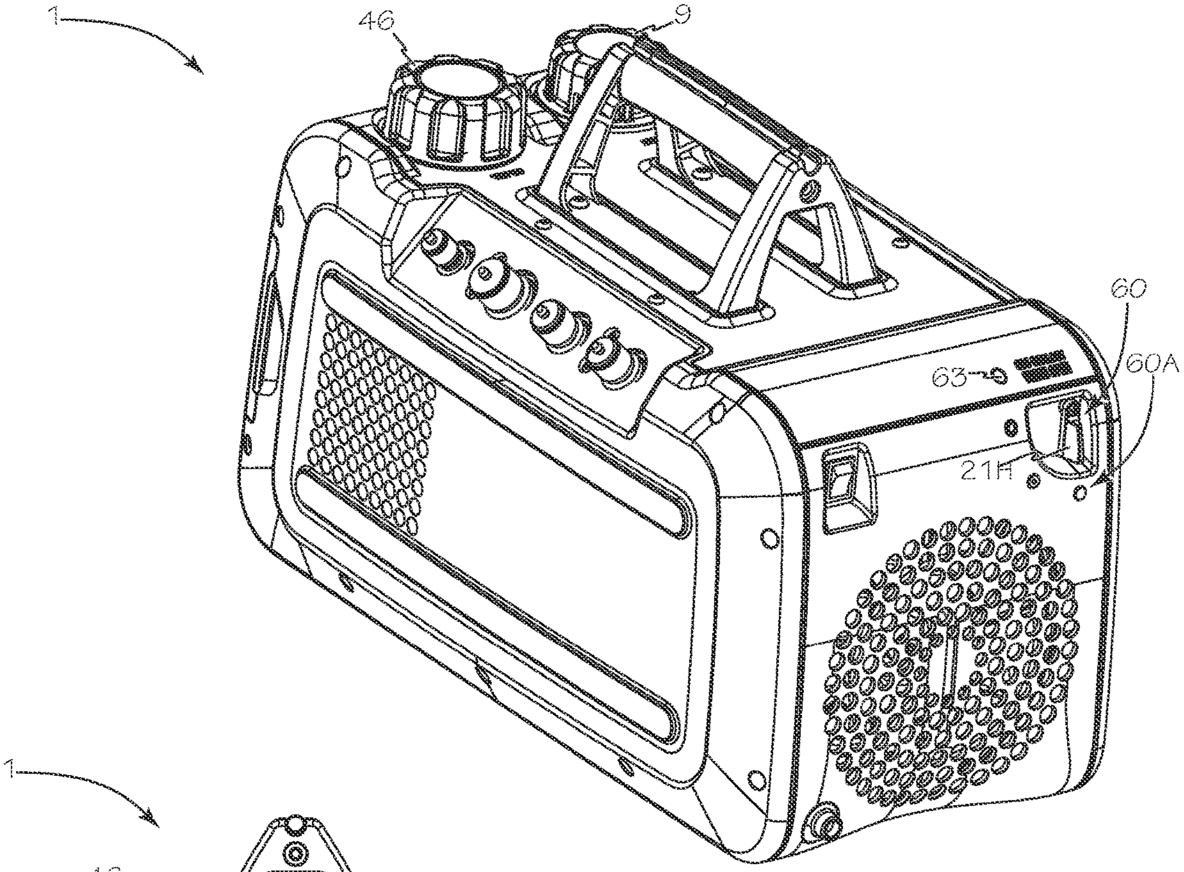
FIG. 34 is a right front perspective view of the vacuum pump system of FIG. 1 configured with the gas ballast valve closed.
Figure 35:
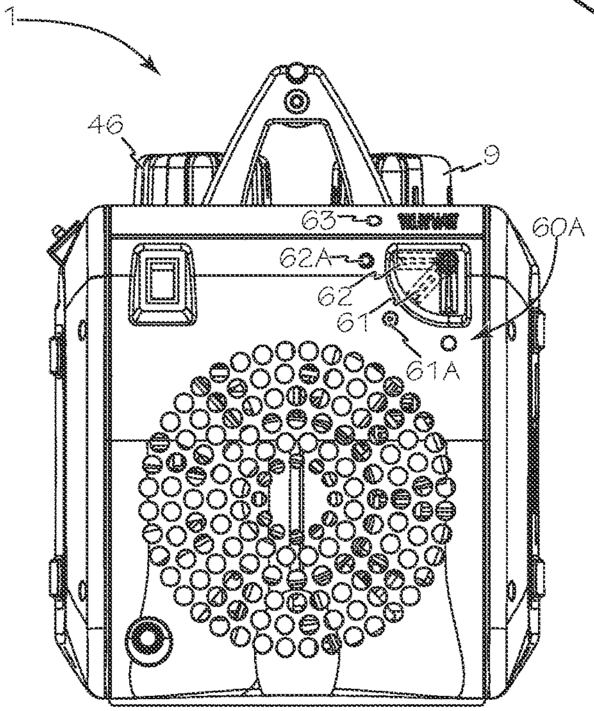
FIG. 35 is a right elevation view of the vacuum pump system of FIG. 1 illustrating the various positions of the gas ballast valve.

As discussed above, gas ballast valve 21 has three fixed positions which are illustrated in FIGS. 34 and 35. Closed position 60 is distinguished by valve handle 21H oriented in line with closed symbol 60A. Partially open position 61 is a fixed position oriented in line with partially open symbol 61A and fully open position 62 is oriented in line with fully open symbol 62A. When the gas ballast valve is in the fully or partially open position, positions 61 or 62 respectively, warning light 63 illuminates to notify the user that the gas ballast valve is not closed. Optionally, gas ballast valve 21 may be limited to two positions, fully closed position 60 and fully open position 62 with warning light 63 illuminating only when the gas ballast valve is in fully open position 62.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A method of changing the oil in a vacuum pump system comprising the steps of:

providing a vacuum pump system comprising:

a vacuum pump with a spring biased oil bottle support platform with a raised and lowered positions and an empty oil bottle having an opening and a removable cap to selectively close the opening;

an oil management system with an oil reservoir having a cover and a sump with oil, the sump having a drain port with a drain valve, the drain valve having an open and a closed position, the oil management system is enclosed by a closeable oil management door;

an oil change reservoir in fluid communication with the oil management system and the vacuum pump, the oil change reservoir sized to contain sufficient oil to support vacuum pump operations while the oil management system is drained and refilled;

removing the cap from the opening of the empty oil bottle;

opening the oil management door;

inclining the oil bottle support platform against the bias spring into the lowered position;

inserting the empty oil bottle between the support platform and the drain port;

raising the oil bottle support platform to the raised position to engage the opening of the empty oil bottle with the drain valve;

rotating the drain valve to the open position to allow the oil in the sump to drain into the empty oil bottle;

rotating the drain valve into the closed position;

inclining the oil bottle support platform to release the oil bottle opening from engagement with the drain valve;

engaging the cap with the oil bottle to seal the opening in the oil bottle; and returning the spring biased platform to the raised position.

2. The method of claim 1 wherein the vacuum pump system is operating during the performance of the method steps.

3. The method of claim 1 wherein the drain valve includes an air vent such that the drain valve air vent is in fluid communication with the oil bottle when the drain valve is in the open position.

4. A method of changing the oil in a vacuum pump with an oil management system having a sump with a drain port and a drain valve and an oil management door comprising the steps of:

opening the oil management door;

pushing an oil bottle support platform against a bias spring into a lowered position away from the drain port;

inserting an empty oil bottle, with an opening, between the support platform and the drain port;

allowing the bias spring to raise the oil bottle support platform to bring the opening of the empty oil bottle into engagement with the drain valve;

rotating the drain valve to an open position to allow oil in the sump to drain into the empty oil bottle;

rotating the drain valve into a closed position;

pushing the oil bottle support platform down to release the oil bottle opening from engagement with the drain valve and removing the oil bottle;

engaging a cap with the opening in the oil bottle to seal the oil bottle; and allowing the oil bottle support platform to return to a raised position.

5. The method of claim 4 wherein the vacuum pump is operating during the performance of the method steps.

6. The method of claim 4 wherein the drain valve includes an air vent that is in fluid communication with the oil bottle when the drain valve is in the open position.

* * * * *